US012184683B2

(12) United States Patent
Cam

(10) Patent No.: US 12,184,683 B2
(45) Date of Patent: Dec. 31, 2024

(54) CYBERSECURITY RESILIENCE BY INTEGRATING ADVERSARY AND DEFENDER ACTIONS, DEEP LEARNING, AND GRAPH THINKING

(71) Applicant: U.S. Army Combat Capabilities Development Command, Army Research Labortary, Adelphi, MD (US)

(72) Inventor: Hasan Cam, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/866,583

(22) Filed: May 5, 2020

(65) Prior Publication Data
US 2021/0352095 A1 Nov. 11, 2021

(51) Int. Cl.
*H04L 9/40* (2022.01)
*G06N 20/00* (2019.01)

(52) U.S. Cl.
CPC ......... *H04L 63/1433* (2013.01); *G06N 20/00* (2019.01); *H04L 63/145* (2013.01)

(58) Field of Classification Search
CPC . H04L 63/1433; H04L 63/142; H04L 63/145; G06N 20/00
See application file for complete search history.

(56) References Cited

U.S. PATENT DOCUMENTS

| 9,912,683 B2 | 3/2018 | Cam |
| 10,176,320 B1 | 1/2019 | McMurdie et al. |
| 10,185,832 B2 | 1/2019 | Cam |
| 10,439,884 B1 * | 10/2019 | Forte ............... G06F 21/62 |
| 10,503,911 B2 | 12/2019 | Chari et al. |
| 10,523,695 B2 | 12/2019 | Fach et al. |

(Continued)

OTHER PUBLICATIONS

Title: Predicting Network Attack Patterns in SDN using Machine Learning Approach Authors: Saurav Nanda, Faheem Zafari, Casimer DeCusatis, Eric Wedaa, Baijian Yang Date: 2016 Publisher: IEEE.*

(Continued)

*Primary Examiner* — Shahriar Zarrineh
*Assistant Examiner* — Gita Faramarzi
(74) *Attorney, Agent, or Firm* — Alan I. Kalb

(57) ABSTRACT

A technique for providing cyber resilience by integrating autonomous adversary and defender agents, deep learning, and graph thinking. An automated competitive environment of autonomous adversary and defender agents is provided such that the adversary agent can emulate the adversary activities, patterns, and intentions using all available cybersecurity measurements and observations, and, the defender agent can generate and suggest the best possible appropriate actions to mitigate or prevent adversary activities while recovering or protecting assets. An automated cyber resilience system with autonomous agents is provided using machine learning and security analytics to first predict the current and future adversary activities and then provide an automated critical asset protection and recovery by enabling agents to take appropriate reactive and pro-active actions at each time step to prevent, recover, or mitigate adversary activities over enterprise and tactical networks.

5 Claims, 25 Drawing Sheets

(56) References Cited

U.S. PATENT DOCUMENTS

| | | | |
|---|---|---|---|
| 11,411,970 B2* | 8/2022 | Hamdi | G06F 21/577 |
| 11,575,693 B1* | 2/2023 | Muddu | G06F 16/444 |
| 12,041,126 B2* | 7/2024 | Morin | G06F 16/901 |
| 2010/0154059 A1* | 6/2010 | McNamee | H04L 43/00 709/224 |
| 2018/0330103 A1* | 11/2018 | Chari | H04L 63/1433 |
| 2018/0367548 A1* | 12/2018 | Stokes, III | H04L 63/1416 |
| 2019/0102546 A1* | 4/2019 | Cheng | G06F 21/74 |
| 2019/0102548 A1* | 4/2019 | Bulut | G06F 21/577 |
| 2019/0258953 A1* | 8/2019 | Lang | G06N 3/08 |
| 2020/0162412 A1* | 5/2020 | Mei | H04L 51/212 |
| 2021/0243217 A1* | 8/2021 | Stelmar Netto | H04L 63/1466 |

OTHER PUBLICATIONS

Title: A Practical Network-based Intrusion Detection and Prevention System Authors: N. Wattanapongsakorn, S. Srakaew, E. Wonghirunsombat, C. Sribavonmongkol,T. Junhom, P. Jongsubsook Date: 2012 Publisher: IEEE.*

Bloem, P., et al., "Finding Network Motifs in Large Graphs using Compression as a Measure of Relevance," Journal of Machine Learning Research, vol. 1, Oct. 2000, pp. 1-36.

Scholtes, I., "When is a Network a Network? Multi-Order Graphical Model Selection in Pathways and Temporal Networks," Proceedings of the 23rd ACM SIGKDD International Conference on Knowledge Discovery and Data Mining, Aug. 13-17, 2017, Halfiax, Nova Scotia, pp. 1037-1046.

Zellers, R., et al., "Neural Motifs: Scene Graph Parsing with Global Context," 2018 IEEE/CVF Conference on Computer Vision and Pattern Recognition (CVPR), Salt Lake City, Utah, Jun. 18-22, 2018, pp. 1-12.

Chai, W., et al., "Path-Based Epidemic Spreading in Networks," IEEE/ACM Transactions on Networking, vol. 1, No. 1, Jul. 2016, pp. 1-14.

Rosenfeld, N., et al., "Semi-Supervised Learning with Compatible Infection Methods," Proc. of the 21st Int. Conference on Artificial Intelligence and Statistics (AIStats), vol. 84, Apr. 9-11, 2018, Lanzarote, Spain, 14 pages.

Kaelbling, L., et al., "Planning and acting in partially observable stochastic domains," Artificial Intelligence, vol. 101, No. 1, May 1998, pp. 99-134.

Cam. H., "Online Detection and Control of Malware Infected Assets," Proc. of the MILCOM 2017, Oct. 23-25, 2017, Baltimore, Maryland, 6 pages.

Du, M., et al., "DeepLog: Anomaly Detection and Diagnosis from System Logs through Deep Learning," Proc. of CCS'17, Oct. 30-Nov. 3, 2017, Dallas, Texas, 14 pages.

Kent, A., "Comprehensive, Multi-Source Cyber-Security Events," Los Alamos National Laboratory, 2015, 8 pages.

Heard, N., et al., "Network-wide anomaly detection via the Dirichlet process," Proc. of IEEE Conference on Intelligent and Security Informatics (ISI), Sep. 28-30 2016, Tucson, Arizona, 5 pages.

* cited by examiner

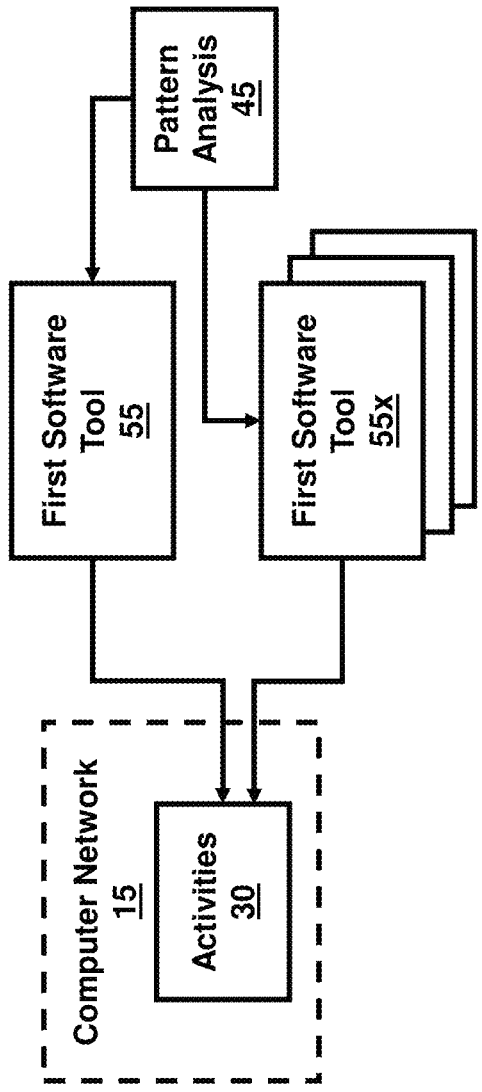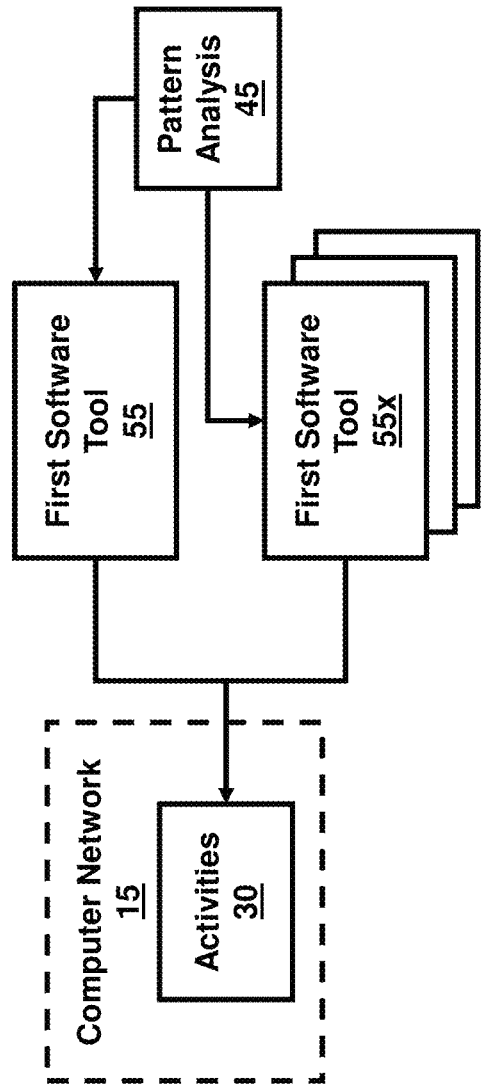

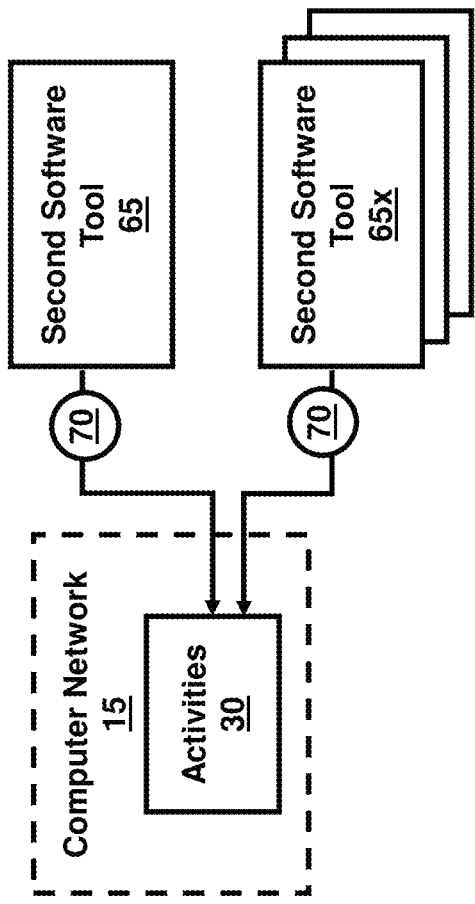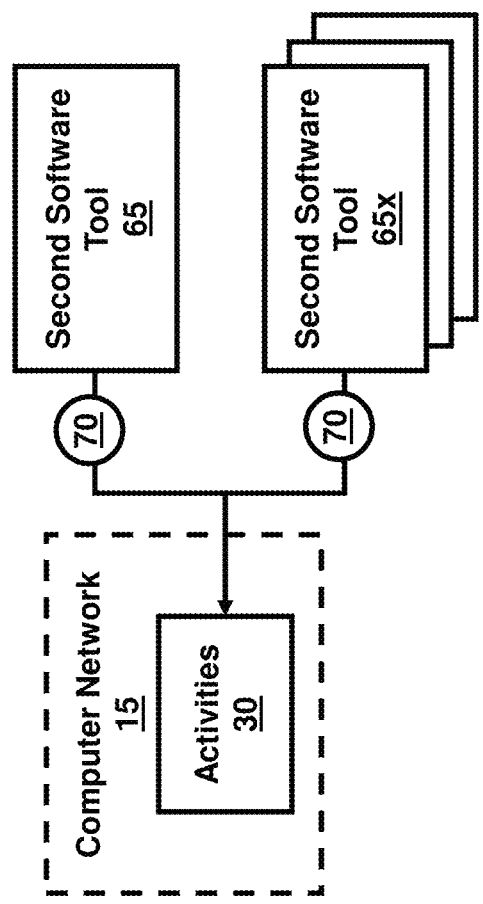

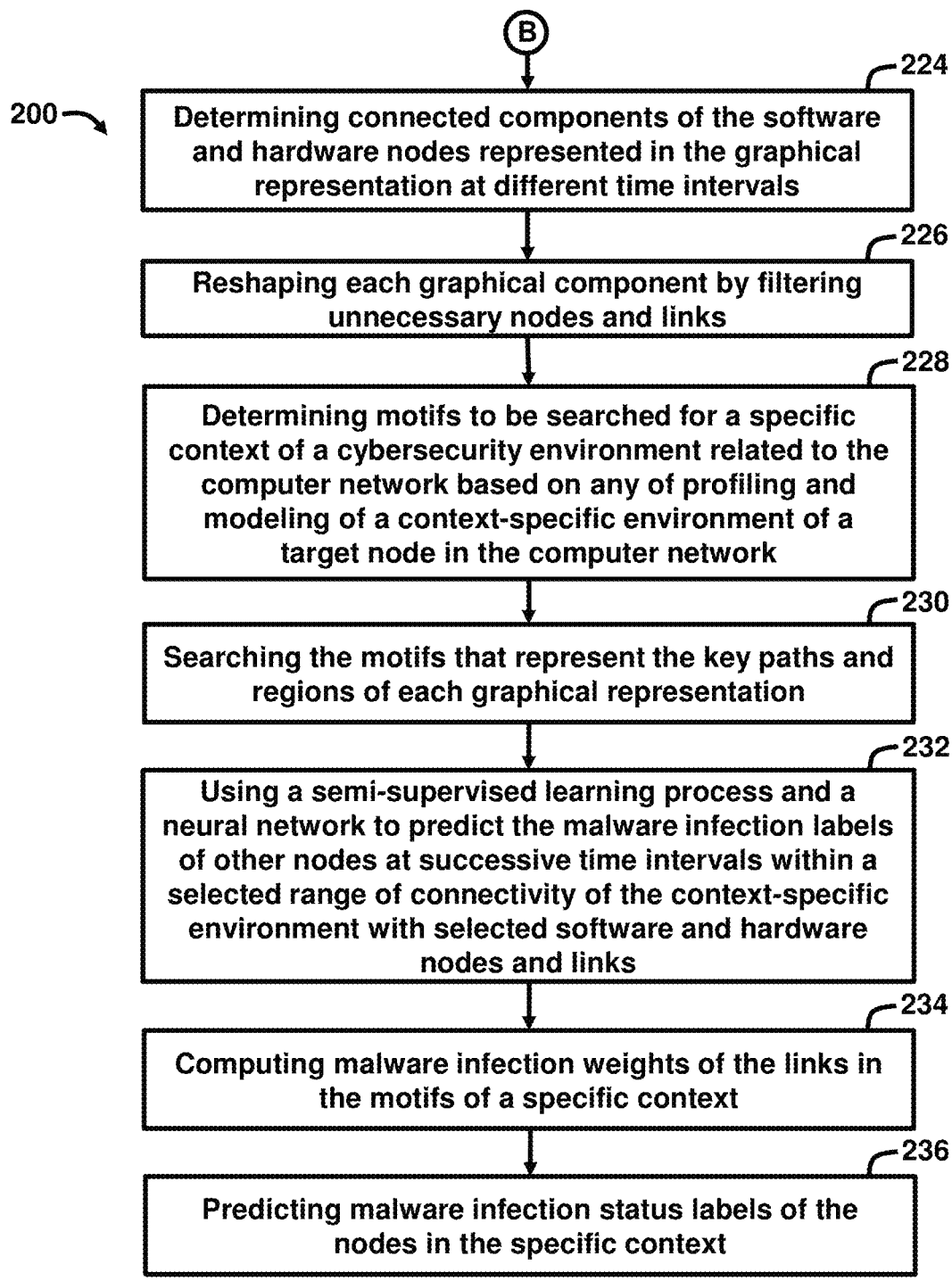

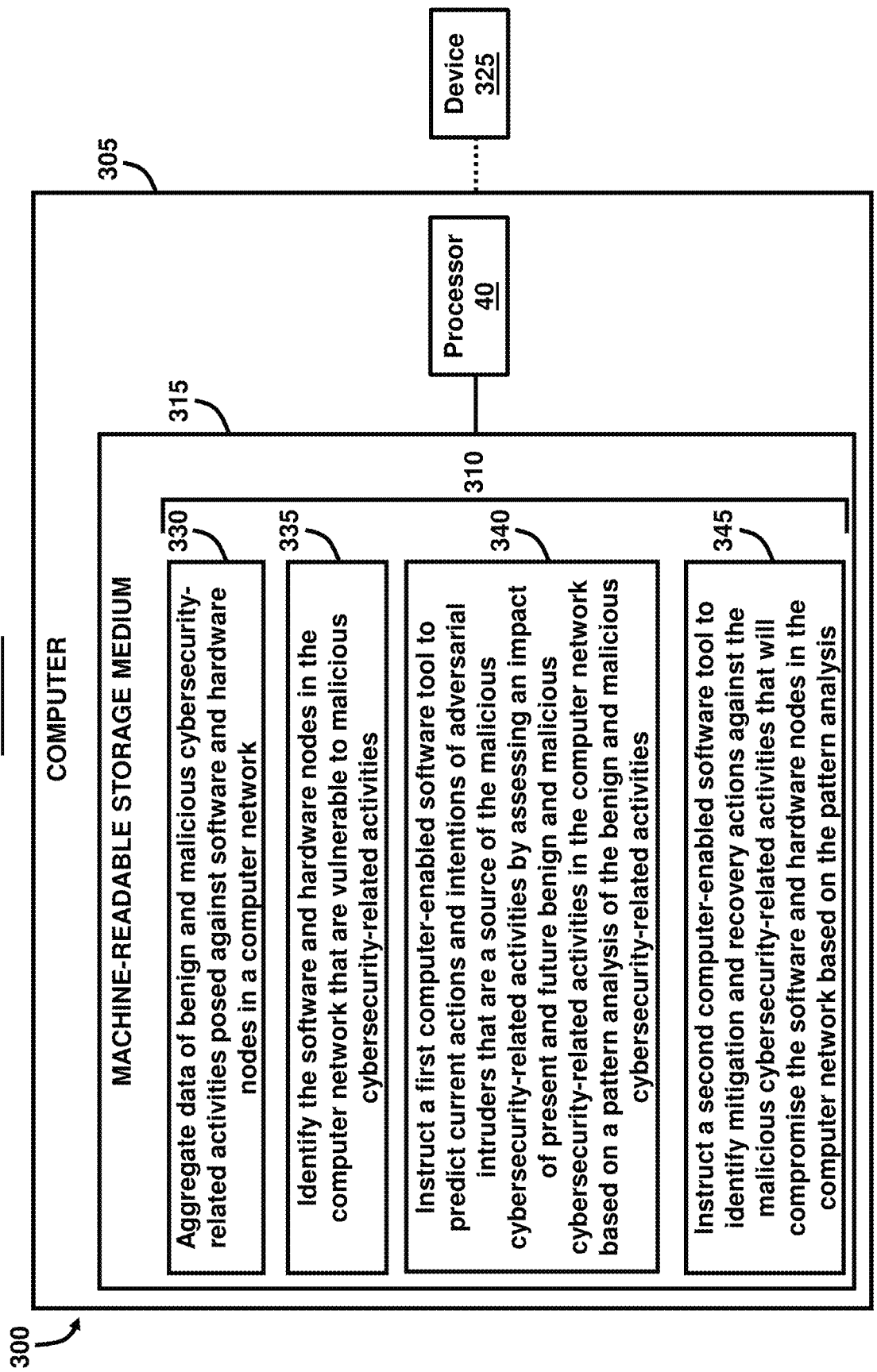

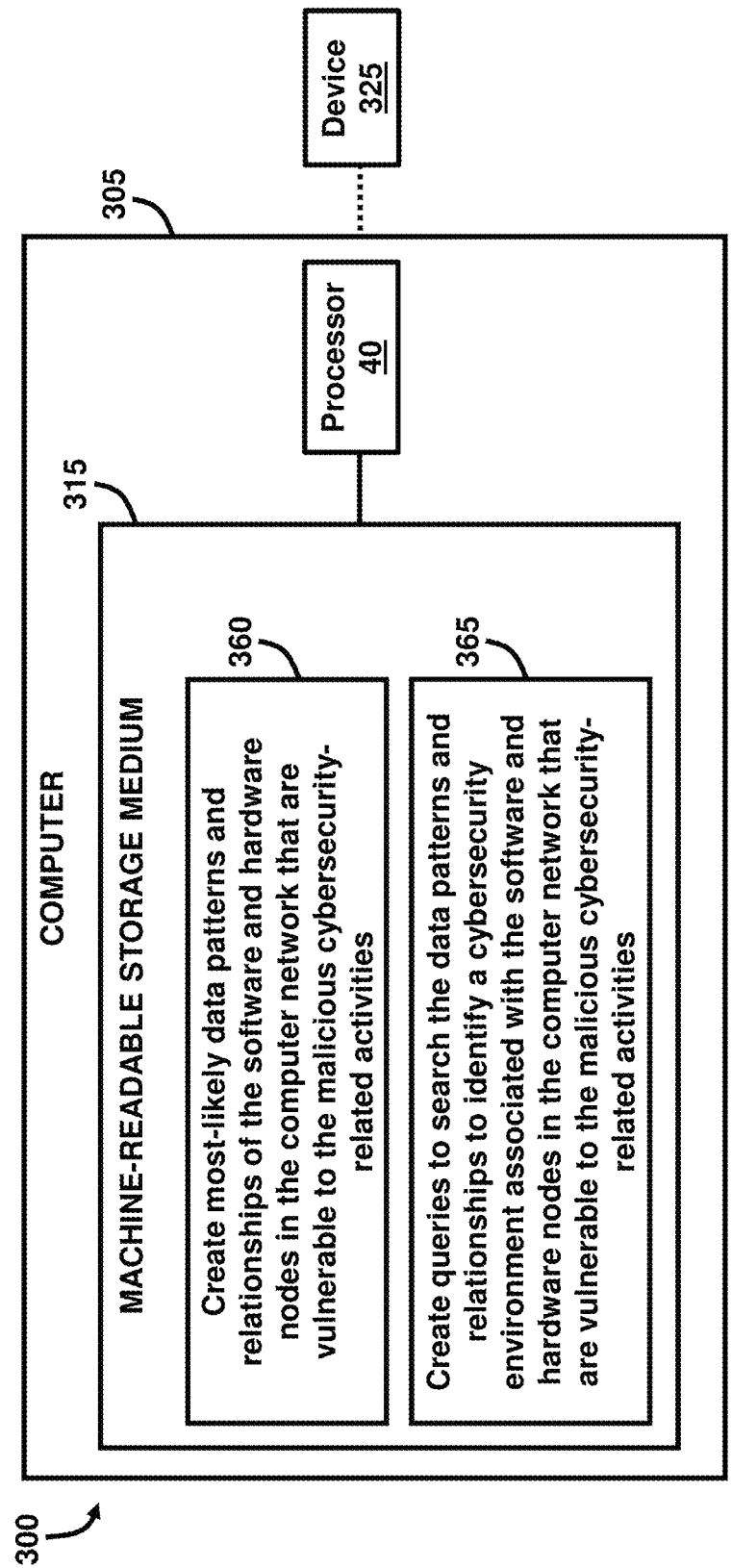

FIG. 13

| time | src_usr | dst_user | src_PC | dst_PC | auth_type | logon_type | auth_orient | success/fail |
|---|---|---|---|---|---|---|---|---|
| 0 | 1 | | | | | | | |
| | ANONYMOUS LOGON@C586 | ANONYMOUS LOGON@C586 | C1250 | C586 | NTLM | Network | LogOn | Success |
| 1 | 1 | | | | | | | |
| | ANONYMOUS LOGON@C586 | ANONYMOUS LOGON@C586 | C586 | C586 | ? | Network | LogOff | Success |
| 2 | 1 | C101$@DOM1 | C101$@DOM1 | C988 | C988 | ? | Network | LogOff | Success |
| 3 | 1 | C1020$@DOM1 | SYSTEM@C1020 | C1020 | C1020 | Negotiate | Service | LogOn | Success |
| 4 | 1 | C1021$@DOM1 | C1021$@DOM1 | C1021 | C625 | Kerberos | Network | LogOn | Success |

FIG. 14

| time | duration | src_PC | src_sort | dst_PC | dst_port | protocol | packet_count | byte_count |
|---|---|---|---|---|---|---|---|---|
| 0 | 1 | 0 | C1065 | 389 | C3799 | N10451 | 6 | 10 | 5323 |
| 1 | 1 | 0 | C1423 | N1136 | C1707 | N1 | 6 | 5 | 847 |
| 2 | 1 | 0 | C1423 | N1142 | C1707 | N1 | 6 | 5 | 847 |
| 3 | 1 | 0 | C14909 | N8191 | C5720 | 2049 | 6 | 1 | 52 |
| 4 | 1 | 0 | C14909 | N8192 | C5720 | 2049 | 6 | 1 | 52 |

FIG. 15

|   | time | src_user | src_PC | dst_PC |
|---|------|----------|--------|--------|
| 0 | 150885 | U620@DOM1 | C17693 | C1003 |
| 1 | 151036 | U748@DOM1 | C17693 | C305 |
| 2 | 151648 | U748@DOM1 | C17693 | C728 |
| 3 | 151993 | U6115@DOM1 | C17693 | C1173 |
| 4 | 153792 | U636@DOM1 | C17693 | C294 |

FIG. 16

| dst_PC | src_PC | src_user_x | timestamp_x | timestamp_y | comp_dst_PC |
|---|---|---|---|---|---|
| C1003 | C17693 | U620@DOM1 | 150885 | 150885.0 | 1 |
| C1003 | C17693 | U620@DOM1 | 150885 | 230395.0 | 0 |
| C1003 | C17693 | U620@DOM1 | 150885 | 463374.0 | 0 |
| C305 | C17693 | U748@DOM1 | 151036 | 151036.0 | 1 |
| C728 | C17693 | U748@DOM1 | 151648 | 151648.0 | 1 |
| C1173 | C17693 | U6115@DOM1 | 151993 | 151993.0 | 1 |
| C294 | C17693 | U636@DOM1 | 153792 | 153792.0 | 1 |
| C294 | C17693 | U636@DOM1 | 153792 | 483455.0 | 0 |
| C294 | C17693 | U636@DOM1 | 153792 | 483939.0 | 0 |
| C294 | C17693 | U636@DOM1 | 153792 | 483981.0 | 0 |
| C294 | C17693 | U636@DOM1 | 153792 | 485925.0 | 0 |
| C294 | C17693 | U636@DOM1 | 153792 | 486443.0 | 0 |
| C294 | C17693 | U748@DOM1 | 153792 | 491747.0 | 0 |
| C5693 | C17693 | U748@DOM1 | 155219 | 155219.0 | 1 |
| C152 | C17693 | U748@DOM1 | 155399 | 155399.0 | 1 |
| C2341 | C17693 | U748@DOM1 | 155460 | 155460.0 | 1 |

FIG. 18

Confusion matrix for LSTM-based infection prediction results

|  | Healthy | infected |
|---|---|---|
| healthy | 96.9%<br>124/128 | 3.1%<br>4 |
| infected | 7.8%<br>12 | 92.2%<br>142/154 |

Actual (rows) / Predicted (columns)

| | precision | recall | f1-score |
|---|---|---|---|
| healthy | 0.91 | 0.97 | 0.94 |
| infected | 0.97 | 0.92 | 0.95 |
| accuracy | | | 0.94 |
| macro avg | 0.94 | 0.95 | 0.94 |
| weighted avg | 0.94 | 0.94 | 0.94 |

CYBERSECURITY RESILIENCE BY INTEGRATING ADVERSARY AND DEFENDER ACTIONS, DEEP LEARNING, AND GRAPH THINKING

GOVERNMENT INTEREST

The embodiments herein may be manufactured, used, and/or licensed by or for the United States Government without the payment of royalties thereon.

BACKGROUND

Technical Field

The embodiments herein generally relate to cybersecurity, and more particularly to utilizing autonomous agents, machine learning and other analysis techniques for predicting and mitigating cybersecurity threats in a computer network.

Description of the Related Art

Malware infection and propagation in a computer network depend on dynamically varying factors including network events, services, applications, interactions and properties of assets, and the strength of malware defense mechanisms, where asset refers to software and hardware. The dynamic identification and analysis of these factors require taking into account all factors at both network and asset levels within a context-specific environment. Cybersecurity tools such as intrusion detection and prevention systems usually generate far too many alerts, indicators or log data, many of which do not have obvious security implications unless their correlations and temporal causality relationships are determined. However, the sheer volume of traffic and signatures, along with the noisy, incomplete, deceptive and heterogeneous nature of cybersecurity measurements and observations data, make it a challenge to infer security status of assets from observations.

SUMMARY

In view of the foregoing, an embodiment herein provides a system for providing cybersecurity resilience for a computer network, the system comprising a sensor that collects data of adversarial cybersecurity-related activities posed against software and hardware nodes in the computer network; a processor that aggregates the data; and performs pattern analysis of the aggregated data by (i) analyzing data relationships of the adversarial cybersecurity-related activities, and (ii) identifying the software and hardware nodes in the computer network that are vulnerable to the adversarial cybersecurity-related activities. The system further comprises a first computer-enabled software tool that predicts current actions and intentions of adversarial intruders that are a source of the adversarial cybersecurity-related activities in the computer network by assessing an impact of present and future adversarial cybersecurity-related activities that will compromise the software and hardware nodes in the computer network based on the pattern analysis; and a second computer-enabled software tool that identifies mitigation and recovery actions against the adversarial cybersecurity-related activities based on the pattern analysis in order to protect the software and hardware nodes from being compromised and to recover the software and hardware nodes that have been compromised.

The pattern analysis may comprise any of artificial intelligence, machine learning, and graph thinking. The first computer-enabled software tool may mimic operational activities of the adversarial intruders that are the source of the adversarial cybersecurity-related activities in the computer network. The mitigation and recovery actions identified by the second computer-enabled software tool may comprise any of preventive action and recovery action against an occurrence and spread of the adversarial cybersecurity-related activities to the software and hardware nodes in the computer network. The processor may create a graphical representation of a data path containing the adversarial cybersecurity-related activities in the computer network using the data relationships of the adversarial cybersecurity-related activities. The data relationships may comprise local and global causality relationships and dependencies in context-specific environments involved with the adversarial cybersecurity-related activities associated with the software and hardware nodes in the computer network that are of interest. The software and hardware nodes in the computer network that are of interest may be identified as vertices of the graphical representation of the data path. The local and global causality relationships and dependencies may comprise edges of the graphical representation of the data path.

The processor may utilize a recurrent neural network that estimates which of the software and hardware nodes within a selected range of connectivity have been subjected to the adversarial cybersecurity-related activities based on any of detected adversarial cybersecurity-related activities on any of the software and hardware nodes within the selected range of connectivity, and predicted adversarial cybersecurity-related activities based on any of cybersecurity alerts generated by the sensor; vulnerability scanning reports stored in memory and retrieved by the processor; data analytic reports stored in memory and retrieved by the processor; and machine learning of operational attributes of the software and hardware nodes in the computer network. The first computer-enabled software tool may be selected to perform actions either autonomously from, or collaboratively with, other first computer-enabled software tools that predict adversarial cybersecurity-related activities in the computer network based on the pattern analysis. The second computer-enabled software tool may be selected to perform actions either autonomously from, or collaboratively with, other second computer-enabled software tools that identify mitigation and recovery actions against the adversarial cybersecurity-related activities.

Another embodiment provides a method of providing cybersecurity resilience for a computer network, the method comprising aggregating data of malware activities posed against software and hardware nodes in a computer network; generating a graphical representation of data relationships of the malware activities associated with the software and hardware nodes in the computer network; identifying the software and hardware nodes in the computer network that are vulnerable to the malware activities based on the data relationships; predicting current actions and intentions of adversarial intruders that are a source of the malware activities in the computer network by assessing an impact of present and future malware activities in the computer network based on the identified software and hardware nodes in the computer network that are vulnerable to the malware activities based on the data relationships; and identifying mitigation and recovery actions against the malware activities based on the data relationships in order to protect the software and hardware nodes from being compromised by the malware activities and to recover the software and hardware nodes that have been compromised by the malware activities.

The data relationships may comprise any of data analytics, data temporal causality analysis, and data regression analysis. The data may comprise cyber sensor measurements for intrusion detection of the computer network, vulnerability scanning of the computer network, network traffic and monitoring of the computer network, and generated incident reports of the computer network. The method may comprise determining key paths within the graphical representation containing the software and hardware nodes in the computer network that are vulnerable to the malware activities; and providing malware infection labels on the graphical representation for the software and hardware nodes in the computer network that are predicted to be vulnerable to the malware activities.

The method may comprise determining connected components of the software and hardware nodes represented in the graphical representation of assets at different time intervals; reshaping each graphical component by filtering unnecessary nodes and links; determining motifs to be searched for a specific context of a cybersecurity environment related to the computer network based on any of profiling and modeling of a context-specific environment of a target node in the computer network, wherein the target node comprises a central node in the graphical representation such that the k-hop neighbors of the central node are determined using a breadth-first search process; searching the motifs that represent the key paths and regions of each graphical representation; for nodes of motifs that have the malware infection labels, using a semi-supervised learning process and a neural network to predict the malware infection labels of other nodes at successive time intervals within a selected range of connectivity of the context-specific environment with selected software and hardware nodes and links; computing malware infection weights of the links in the motifs of a specific context; and predicting malware infection status labels of the nodes in the specific context.

The method may comprise generating a context-specific graphical representation containing nodes and edges representing software and hardware assets in the computer network; and labeling the nodes as being either known malware-infected labeled nodes or unknown malware-infected labeled nodes. The method may comprise predicting an infection status of nodes that are affected by malware infection propagation in the computer network. The method may comprise identifying a malware infection status label of all nodes that are denoted as being unknown malware-infected; identifying potential infection propagation paths from the known malware-infected labeled nodes to the unknown malware-infected labeled nodes; computing infection propagation weights of the edges of the identified potential infection propagation paths, wherein an infection propagation weight of each edge equals a probability that a communication with malware infection can be established between two nodes of the edge; computing the infection propagation weights of the nodes of the identified potential infection propagation paths, wherein the infection propagation weight of each edge of the node equals a maximum average of incoming and outgoing infection propagation weights of the node; and determining whether the infection propagation weight of the node is greater than a selected infection probability.

Another embodiment provides a machine-readable storage medium comprising computer-executable instructions that when executed by a computer cause a processor of the computer to aggregate data of benign and malicious cybersecurity-related activities posed against software and hardware nodes in a computer network; identify the software and hardware nodes in the computer network that are vulnerable to malicious cybersecurity-related activities; instruct a first computer-enabled software tool to predict current actions and intentions of adversarial intruders that are a source of the malicious cybersecurity-related activities by assessing an impact of present and future benign and malicious cybersecurity-related activities in the computer network based on a pattern analysis of the benign and malicious cybersecurity-related activities; and instruct a second computer-enabled software tool to identify mitigation and recovery actions against the malicious cybersecurity-related activities that will compromise the software and hardware nodes in the computer network based on the pattern analysis.

The computer-executable instructions, when executed, may further cause the processor to utilize any of logistic regression and partially-observable Markov decision processing to identify the software and hardware nodes in the computer network that are vulnerable to the malicious cybersecurity-related activities. The computer-executable instructions, when executed, may further cause the processor to train long short-term memory (LSTM) network for performing machine learning to identify the software and hardware nodes in the computer network that are vulnerable to the malicious cybersecurity-related activities. The computer-executable instructions, when executed, may further cause the processor to create most-likely data patterns and relationships of the software and hardware nodes in the computer network that are vulnerable to the malicious cybersecurity-related activities; and create queries to search the data patterns and relationships to identify a cybersecurity environment associated with the software and hardware nodes in the computer network that are vulnerable to the malicious cybersecurity-related activities.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 7A is a block diagram illustrating the first computer-enabled software tool of FIG. 1 operating autonomously from other first computer-enabled software tools, according to an embodiment herein;

FIG. 7B is a block diagram illustrating the first computer-enabled software tool of FIG. 1 operating collaboratively with other first computer-enabled software tools, according to an embodiment herein;

FIG. 7C is a block diagram illustrating the second computer-enabled software tool of FIG. 1 operating autonomously from other second computer-enabled software tools, according to an embodiment herein;

FIG. 7D is a block diagram illustrating the second computer-enabled software tool of FIG. 1 operating collaboratively with other second computer-enabled software tools, according to an embodiment herein;

FIG. 8C is a flow diagram illustrating a method of providing an output for a model-guided motifs process, according to an embodiment herein;

FIG. 12A is a block diagram illustrating a system for handling threats to a computer network, according to an embodiment herein;

FIG. 12D is a block diagram illustrating a system for performing pattern analysis of software and hardware nodes in a computer network, according to an embodiment herein;

FIG. 13 is a table illustrating experimental data samples of the authentication of data, according to an embodiment herein;

FIG. 14 is a table illustrating experimental data samples of a data flow, according to an embodiment herein;

FIG. 15 is a table illustrating experimental data samples of penetration testing, according to an embodiment herein;

FIG. 16 is a table illustrating experimental data samples with infection status labels, according to an embodiment herein;

FIG. 18 illustrates a confusion matrix for LSTM-based infection prediction experimental results, according to an embodiment herein.

DETAILED DESCRIPTION

Figure 1:
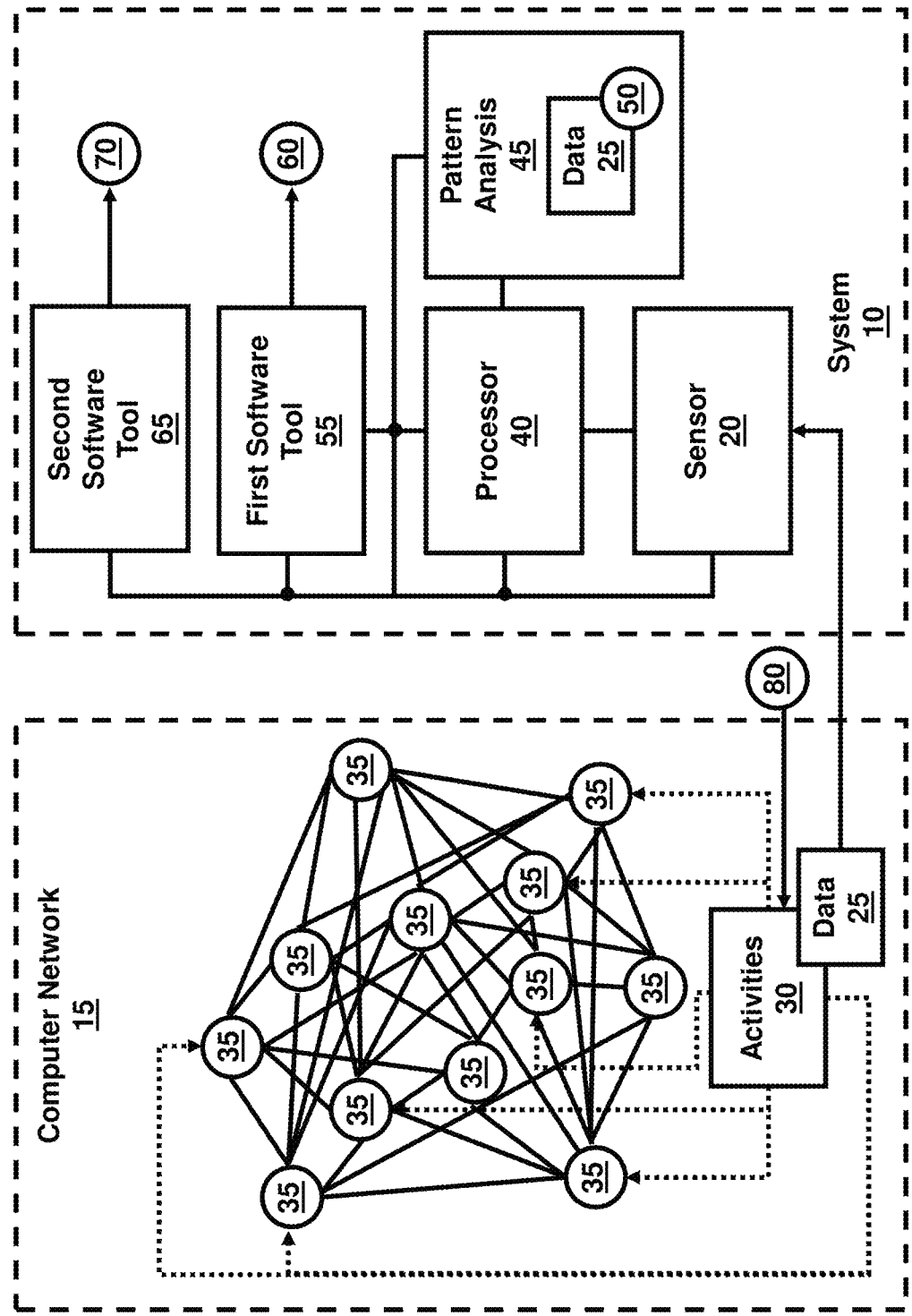
FIG. 1 is a block diagram illustrating a system for providing cybersecurity resilience for a computer network, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide system and method for providing cyber resilience over enterprise and mobile networks by integrating autonomous adversary and defender agents, deep learning, and graph thinking. The automated system and method can be used to dynamically track cybersecurity adversarial activities and to determine cost-effective defensive actions against attacks, with the help of autonomous and/or collaborative agents that learn and determine their actions using machine learning and graph thinking. The compromised entities are detected, recovered, and reinstated as soon as possible by taking reactive and pro-active actions systematically.

In order to identify malware infection and spread in the neighborhood of a given set of specific assets; i.e., software and hardware nodes in a computer network, the embodiments herein provide a combination of graph-based and machine learning approaches to inferring malware infection status of assets and determining recovery actions by analyzing temporal causality relationships of benign and malicious activities and employing deep learning and agents. When some assets are estimated to be likely infected or exploited over the neighborhood of critical assets, the embodiments herein first aims at inferring the state of infections, propagation patterns, and motifs (i.e., characteristic graph patterns, connected subgraphs, or context regions of similarity). When a node is compromised by an exploit, the infection propagation of a compromised asset depends on whether the exploit of infection can propagate and come across those assets with relevant vulnerabilities that could be exploited. Hence, the propagation of an infectious asset requires it to not only contact with neighboring assets but also their vulnerabilities of services or communications to be relevant to specific infection of asset. However, in contrast to the conventional solutions of path-based infection propagations, which require only contacts or some interactions with neighboring nodes, where Markov chain analysis or Dirichlet distribution functions are used, the embodiments herein utilizes all constraints of infection to be met when infection paths are formed, based on all types of available cybersecurity information analysis over context-specific environments of critical assets and links. Additionally, the embodiments herein provide adversary and defender agents, which are software tools, such that the adversary agent mimics the activities and intentions of adversary, while the defender agent helps determine defense actions against infection and exploitation of critical assets and network links. The defender agent suggests preventive or recovery actions against the occurrence and spread of infection and exploitation over the neighborhood of critical assets and links, based on the dependencies among infections, exploits, and relevant vulnerabilities of assets and communication links.

The intrusions that cause malware infections are often obfuscated to the extent that its traces and fingerprints are hidden within different types of data (e.g., intrusion detection system (IDS) alerts, firewall logs, reconnaissance scans, network traffic patterns, and other computer monitoring data) that are involved with a wide range of assets and time points. However, even a small organization's security operation center may end up dealing with an increasingly huge volume of daily data. Given the time constraints, service level agreements, and computational and storage resource constraints in the analysis of such data, the embodiments herein first identify and extract high-quality data describing interactions and characteristics of cyber events among assets. Moreover, the embodiments herein identify how the raw data size of cyber events can be reduced significantly in real-time and what effective methods can be used to detect and analyze the noisy data of intrusion and vulnerability detections and exploitations. To accomplish this, the embodiments herein utilize temporal causality analysis of main cyber sensor observations and events including intrusion alerts, vulnerabilities, attacker activities, firewall and host-based security system log data, and network traffic. Referring now to the drawings, and more particularly to FIGS. 1 through 19, where similar reference characters denote corresponding features consistently throughout the figures, there are shown preferred embodiments. In the drawings, the size and relative sizes of components, layers, and regions, etc. may be exaggerated for clarity.

FIG. 1 is a block diagram illustrating a system 10 for providing cybersecurity resilience for a computer network 15. In some examples, the computer network 15 may comprise any suitable type of computer network such as a local area network (LAN), personal area network (PAN), wide area network (WAN), wireless local area network (WLAN), campus area network (CAN), metropolitan area network (MAN), storage-area network (SAN), system-area network (SAN), passive optical local area network (PO-LAN), enterprise private network (EPN), virtual private network (VPN), intranets, commercially-accessible networks, government networks, military networks, classified or secured networks, among others, etc. Furthermore, the computer network 15 may be wirelessly-based or wired-based or a combination thereof.

The system 10 comprises a sensor 20 that collects data 25 of adversarial cybersecurity-related activities 30 posed against software and hardware nodes 35 (i.e., assets) in the computer network 15. In an example, the adversarial cybersecurity-related activities 30 may comprise any type of infection activity that causes the software and hardware nodes 35 to work in a manner causing harmful or adverse effects and impact of infection and exploitation to the functioning of the software and hardware nodes 35 themselves, other software and hardware nodes 35 in the computer network 15, or any other operational and/or functional aspect of the computer network 15. As used herein, the term "software and hardware nodes" and "assets" may be used interchangeably. The software and hardware nodes 35 may be linked together in the computer network 15 through wired and/or wireless links. Moreover, some of the nodes may only contain software, some of the nodes may only contain hardware, and some of the nodes may be combinations of software and hardware components. Accordingly, the term "software and hardware nodes" as used herein is not restricted to a node that only contains both software and hardware elements. Moreover, the software and hardware nodes 35 may comprise stationary or mobile components. In an example, the sensor 20 may be connected to the computer network 15 through a gateway (not shown) or other connection mechanism. In some examples, the sensor 20 may comprise any of an electrical, mechanical, magnetic, or optical sensor, or a combination thereof used to collect the data 25. In an example, the sensor 20 may comprise a data traffic sensor that detects the amount/size, type, location, and source of the data 25 in the computer network 15, among other attributes. According to an example, the sensor 20 may collect the data 25 in real-time or according to scheduled intervals. Furthermore, the sensor 20 may work together with a group of sensors for monitoring the data 25 in the computer network 15. In an example, the sensor 20 may contain a sensing element (not shown) that detects the data 25 and creates an electrical signal that is transmitted to electrical circuitry (not shown) to a processor 40. In other examples, the sensor 20 may comprise transistors (not shown), which may further include field effect transistors (FETs), junction gate FETs (JFET) transistors, bipolar junction transistors (BJT), or metal-oxide semiconductor FET (MOSFET) transistors.

The sensor 20 may be wirelessly connected to the processor 40 or may be operatively connected through a wired connection such that the sensor 20 may send signals (including mobile communication signals) to the processor 40 to transmit the data 25. For example, the mobile communication signals may be signals in accordance with any suitable type of communication standard or protocol such as the 802.11b wireless communication standard, as well as Bluetooth®, ZigBee®, and Radio-frequency identification (RFID) standards, for example. Accordingly, as described above, the sensor 20 and the processor 40 may be wired or wirelessly linked to one another, to the computer network 15, and/or to other systems (not shown). In a wireless connection, the processor 40 may be configured in a separate device or may be part of a server device (not shown) communicating with linked devices in a client/server relationship and, in one example, through a cloud computing environment.

The processor 40 of the system 10 aggregates the data 25 using any suitable software and/or hardware database processing technique. The processor 40 also performs pattern analysis 45 of the aggregated data 25 by (i) analyzing data relationships 50 of the adversarial cybersecurity-related activities 30, and (ii) identifying the software and hardware nodes 35 in the computer network 15 that are vulnerable to the adversarial cybersecurity-related activities 30. The pattern analysis 45 may include any type of automated pattern recognition technique or algorithm. Moreover, the data relationships 50 may comprise any type of patterns, regularities, classifications, structures, or other suitable manner of combining the data 25 into classes, groups, or other categories.

The system 10 includes a first computer-enabled software tool 55 that predicts current actions and intentions of adversarial intruders 80 that are a source of the adversarial cybersecurity-related activities 30 in the computer network 15 by assessing an impact 60 of present and future adversarial cybersecurity-related activities 30 that will compromise the software and hardware nodes 35 in the computer network 15 based on the pattern analysis 45. In an example, the first computer-enabled software tool 55 may be a set of computer-executable instructions operated by the processor 40 or other device in the system 10 or remotely-linked to the system 10 in real-time and/or in scheduled intervals. According to an example, the prediction of the impact 60 may include an output to a display screen (not shown in FIG. 1) or any of an audible, visible, and vibrational alert that is output to an electrical device such as a computer, tablet, smartphone, wearable device, smart appliance, or any type of monitoring device such that the impact 60 may be computer-readable data that identifies what the present and future adversarial cybersecurity-related activities 30 are in the computer network 15, and how the present and future adversarial cybersecurity-related activities 30 are affecting and/or will affect the software and hardware nodes 35 in the computer network 15. According to an example, the first computer-enabled software tool 55 may be referred to herein has an adversary agent.

The system 10 includes a second computer-enabled software tool 65 that identifies mitigation and recovery actions 70 against the adversarial cybersecurity-related activities 30 based on the pattern analysis 45 in order to protect the software and hardware nodes 35 from being compromised and to recover the software and hardware nodes 35 that have been compromised. In an example, the second computer-enabled software tool 65 may be a set of computer-executable instructions operated by the processor 40 or other device in the system 10 or remotely-linked to the system 10 in real-time and/or in scheduled intervals. According to an example, the identification of the mitigation and recovery actions 70 may include an output to a display screen (not shown) or any of an audible, visible, and vibrational alert that is output to an electrical device such as a computer, tablet, smartphone, wearable device, smart appliance, or any type of monitoring device such that the mitigation and recovery actions 70 provides a set of computer-executable instructions to counter and remedy the action(s) taken by the adversarial cybersecurity-related activities 30. According to an example, the second computer-enable software tool 65 may be referred to as a defender agent.

Various examples described herein with respect to the processor 40 may include both hardware and software elements. The examples that are implemented in software may include firmware, resident software, microcode, etc. Other examples may include a computer program product configured to include a pre-configured set of instructions, which when performed, may result in actions as stated in conjunction with the methods described above. In an example, the preconfigured set of instructions may be stored on a tangible non-transitory computer readable medium or a program storage device containing software code.

In some examples, the processor 40 and various other processing devices described herein and/or illustrated in the figures may be embodied as hardware-enabled modules and may be configured as a plurality of overlapping or independent electronic circuits, devices, and discrete elements packaged onto a circuit board to provide data and signal processing functionality within a computer and/or electronic device. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such as Oracle® relational databases), the data objects can be configured as a table or column. Other configurations include specialized objects, distributed objects, object-oriented programming objects, and semantic web objects, for example. The data object models can be configured as an application programming interface for creating HTML and XML electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

The processor 40 may comprise any of an integrated circuit, an ASIC, FPGA, a microcontroller, a microprocessor, an ASIC processor, a digital signal processor, a networking processor, a multi-core processor, or other suitable processors. In some examples, the processor 40 may comprise a CPU of a computer or other device. In other examples the processor 40 may be a discrete component independent of other processing components in a computer or other device. In other examples, the processor 40 may be a microcontroller, hardware engine, hardware pipeline, and/or other hardware-enabled device suitable for receiving, processing, operating, and performing various functions required by a computer or other device.

The processing techniques performed by the processor 40 may be implemented as one or more software modules in a set of logic instructions stored in a machine or computer-readable storage medium such as RAM, ROM, PROM, firmware, flash memory, etc. in configurable logic such as, for example, PLAs, FPGAs, CPLDs, in fixed-functionality hardware logic using circuit technology such as, for example, ASIC, CMOS, or TTL technology, or any combination thereof. For example, computer program code to carry out processing operations performed by the processor 40 may be written in any combination of one or more programming languages.

Figure 2B:
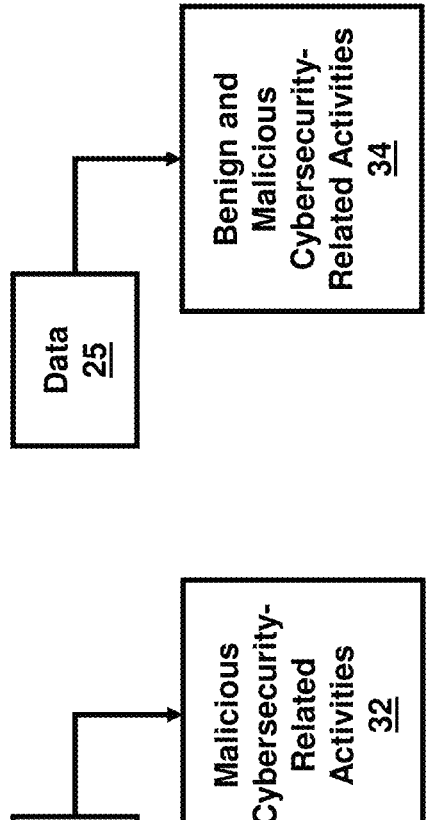
FIG. 2B is a block diagram illustrating an example of the data of FIG. 1, according to an embodiment herein.
Figure 2A:
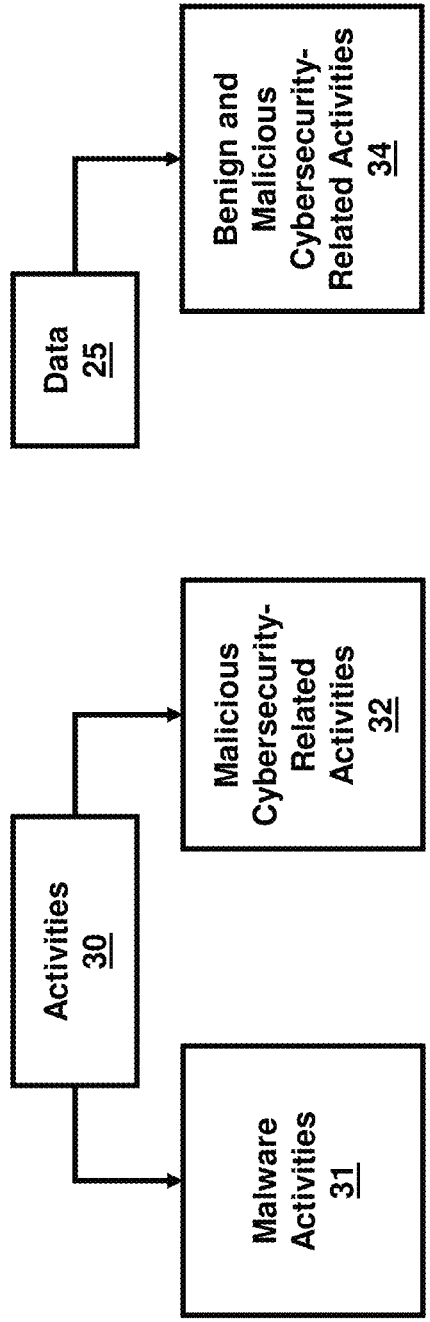
FIG. 2A is a block diagram illustrating examples of the adversarial cybersecurity-related activities of FIG. 1, according to an embodiment herein.
Figure 2C:
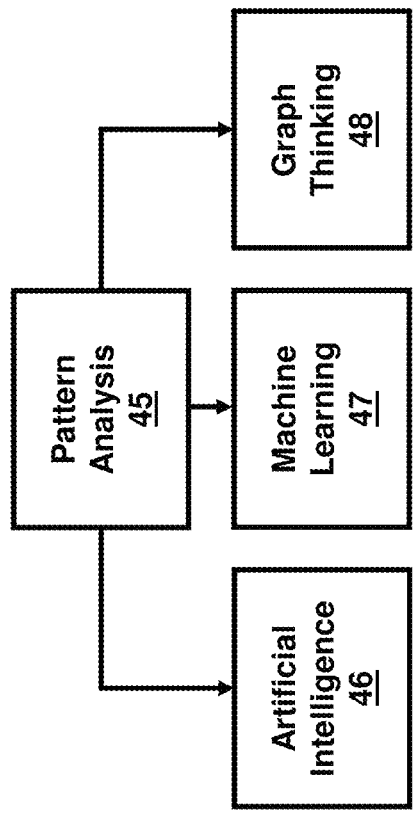
FIG. 2C is a block diagram illustrating examples of the pattern analysis of FIG. 1, according to an embodiment herein.

FIG. 2A, with reference to FIG. 1, is a block diagram illustrating that the adversarial cybersecurity-related activities 30 may comprise any of malware activities 31 and malicious cybersecurity-related activities 32. The malware activities 31 and malicious cybersecurity-related activities 32 may affect the operations of software and hardware in the computer network 15. FIG. 2B, with reference to FIGS. 1 and 2A, is a block diagram illustrating that the data 25 may include benign and malicious cybersecurity-related activities 34. Accordingly, the data 25 may encompass a wide range of actions that the software and hardware nodes 35 in the computer network 15 are undergoing. FIG. 2C, with reference to FIGS. 1 through 2B, is a block diagram illustrating that the pattern analysis 45 may comprise any of artificial intelligence 46, machine learning 47, and graph thinking 48. In an example, the pattern analysis 45 may utilize natural language processing, statistical analysis, computational simulations, algorithms, modeling, among other forms of data intelligence including computer graph modeling to identify the data relationships 50 of the adversarial cybersecurity-related activities 30 affecting the software and hardware nodes 35 in the computer network 15. Graph thinking 48 generally allows for the prediction of which healthy assets (i.e., software and hardware nodes 35) may be infected/exploited through propagation in the near future by those assets that are already infected or exploited.

Figure 3:
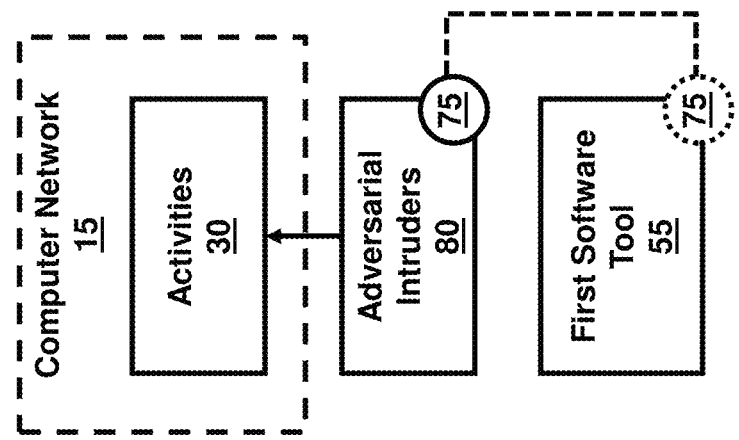
FIG. 3 is a block diagram illustrating aspects of the first computer-enabled software tool of FIG. 1, according to an embodiment herein.

FIG. 3, with reference to FIGS. 1 through 2C, is a block diagram illustrating that the first computer-enabled software tool 55 may mimic operational activities 75 of the adversarial intruders 80 that are the source of the adversarial cybersecurity-related activities 30 in the computer network 15. In an example, the first computer-enabled software tool 55 may be programmed to follow the processing routines associated with the adversarial intruders 80, which may be other software and/or hardware elements that are external to the computer network 15, but which have penetrated access to the software and hardware nodes 35 in the computer network 15. In some examples, the operational activities 75 may comprise processing routines, software code, hardware switching, or a combination of these types of actions.

Figure 4:
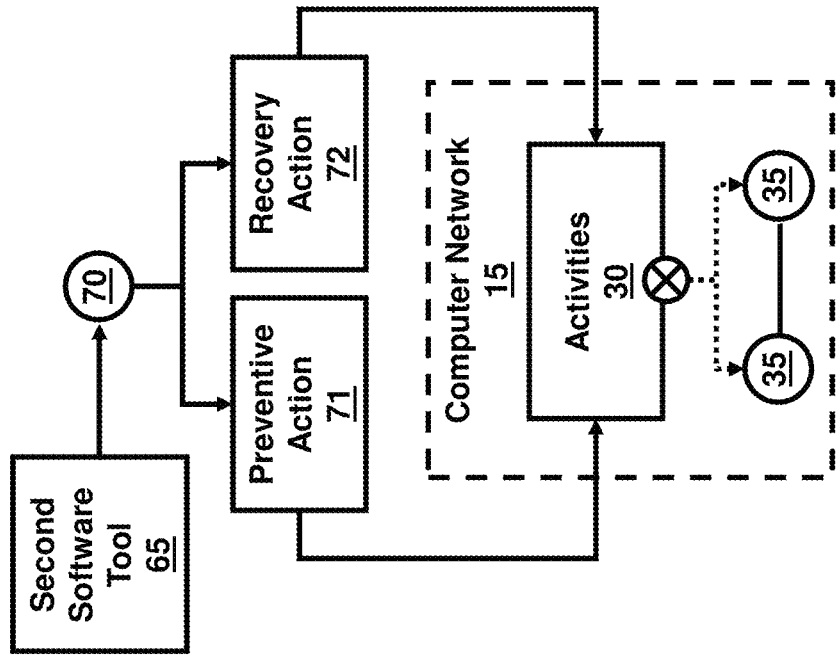
FIG. 4 is a block diagram illustrating aspects of the second computer-enabled software tool of FIG. 1, according to an embodiment herein.

FIG. 4, with reference to FIGS. 1 through 3, is a block diagram illustrating that the mitigation and recovery actions 70 identified by the second computer-enabled software tool 65 may comprise any of preventive action 71 and recovery action 72 against an occurrence and spread of the adversarial cybersecurity-related activities 30 to the software and hardware nodes 35 in the computer network 15. In an example, the second computer-enabled software tool 65 may be programmed to create computer-executable instructions executed by the processor 40 or other device that defend against the adversarial cybersecurity-related activities 30 by removing the adversarial cybersecurity-related activities 30 from the computer network 15, blocking the adversarial cybersecurity-related activities 30 from reaching software and hardware nodes 35 in the computer network 15, isolating the adversarial cybersecurity-related activities 30 to known infected nodes in the computer network 15, and returning the computer network 15 along with known infected nodes in the computer network 15 to their intended operational status. In some examples, the preventive action 71 and recovery action 72 may comprise processing routines, software code, hardware switching, or a combination of these types of actions.

Figure 5:
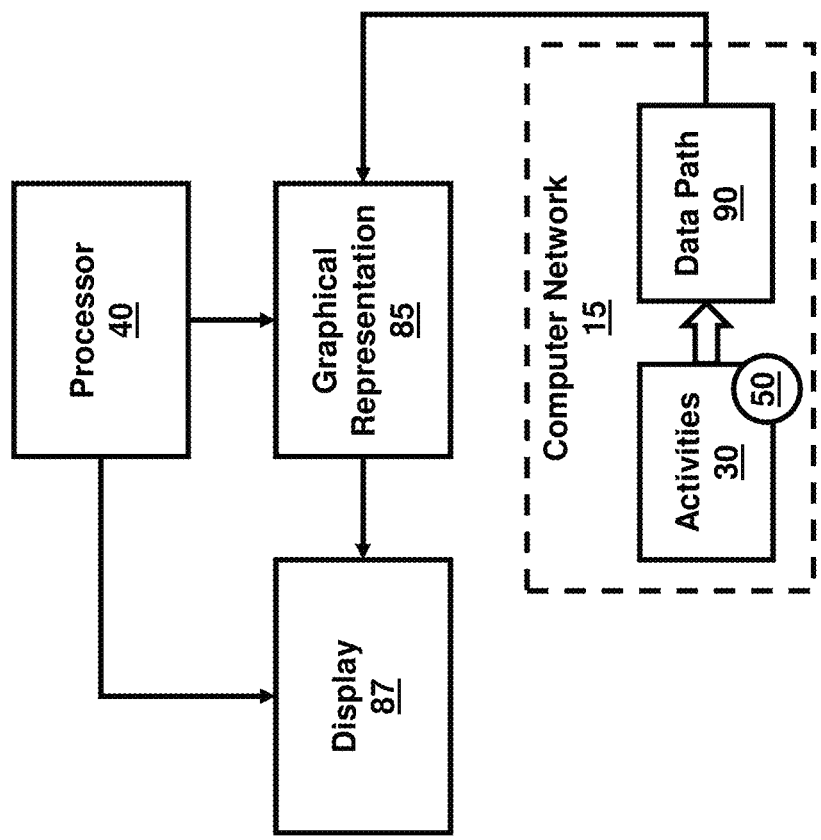
FIG. 5 is a block diagram illustrating an output of the processor of FIG. 1, according to an embodiment herein.

FIG. 5, with reference to FIGS. 1 through 4, is a block diagram illustrating that the processor 40 may create a graphical representation 85 of a data path 90 containing the adversarial cybersecurity-related activities 30 in the computer network 15 using the data relationships 50 of the adversarial cybersecurity-related activities 30. The graphical representation 85 may be an aspect of the graph thinking 48 utilized in the pattern analysis 45 performed by the processor 40. In an example, the graphical representation 85 may be output to a display 87 such as a monitor or any other type of display screen of a computer, tablet device, television, smartphone, etc. In an example, the graphical representation 85 may be in the form of a tree data structure representing the software and hardware nodes 35 in the computer network 15, and the data path 90 may be represented by links or lines connecting the software and hardware nodes 35 denoted in the graphical representation 85. In an example, the data relationships 50 may comprise local and global causality relationships and dependencies in context-specific environments involved with the adversarial cybersecurity-related activities 30 associated with the software and hardware nodes 35 in the computer network 15 that are of interest. Logistic regression and a Partially-Observable Markov Decision Process (POMDP) may be used to estimate those assets and context-specific environments that are relevant to malware infection. The software and hardware nodes 35 in the computer network 15 that are of interest may be identified as vertices of the graphical representation 85 of the data path 90. Moreover, the local and global causality relationships and dependencies may comprise edges of the graphical representation 85 of the data path 90.

Figure 6:
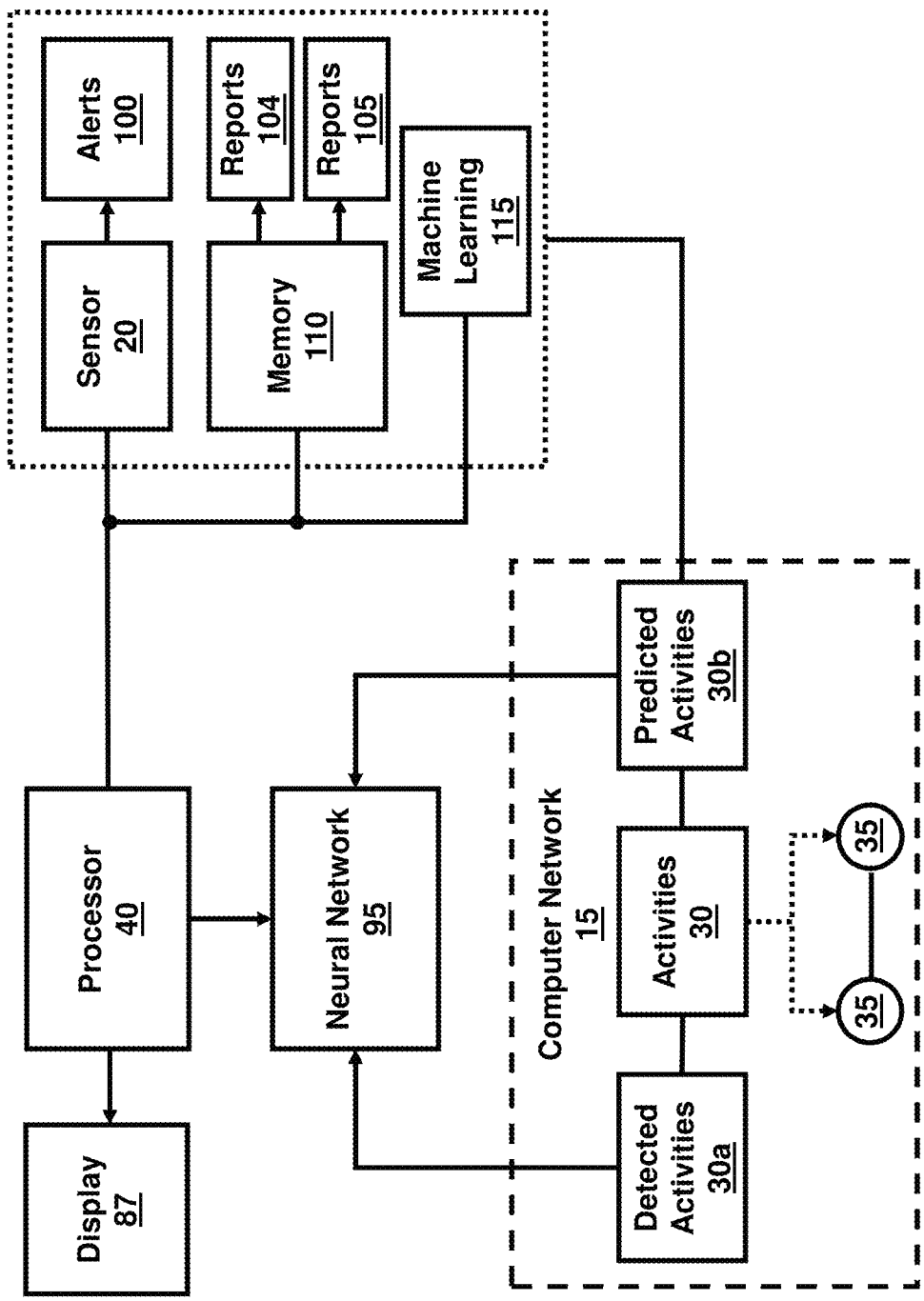
FIG. 6 is a block diagram illustrating an input of the processor of FIG. 1, according to an embodiment herein.

FIG. 6, with reference to FIGS. 1 through 5, is a block diagram illustrating that the processor 40 may utilize a recurrent neural network 95, such as a long short-term memory (LSTM) network, that estimates which of the software and hardware nodes 35 within a selected range of connectivity (i.e., within a selected neighborhood) have been subjected to the adversarial cybersecurity-related activities 30 based on any of detected adversarial cybersecurity-related activities 30a on any of the software and hardware nodes 35 within the selected range of connectivity, and predicted adversarial cybersecurity-related activities 30b. The detected adversarial cybersecurity-related activities 30a and the predicted adversarial cybersecurity-related activities 30b may be detected by the sensor 20 and predicted by the first computer-enabled software tool 55, according to an example.

Moreover, the predicted adversarial cybersecurity-related activities 30b may be based on any of cybersecurity alerts 100 generated by the sensor 20, vulnerability scanning reports 104 stored in memory 110 and retrieved by the processor 40; data analytic reports 105 stored in memory 110 and retrieved by the processor 40, and machine learning 115 of operational attributes of the software and hardware nodes 35 in the computer network 15. In an example, the cybersecurity alerts 100 may comprise any of an audible, visible, and vibrational alert that is output to an electrical device such as a computer, tablet, smartphone, wearable device, smart appliance, or any type of output device such as the display 87. In an example, the data analytic reports 105 may comprise computer-readable reports including software code executed by the processor 40, and output on the display 87. According to an example, the machine learning 115 may comprise natural language processing, statistical analysis, computational simulations, algorithms, modeling, or a combination thereof, which is executed by the processor 40 or other processing devices or systems. In an example, the memory 110 may be Random Access Memory, Read-Only Memory, a cache memory, or other type of storage mechanism that are local to, or remotely located from, the processor 40, according to an example.

FIGS. 7A and 7B, with reference to FIGS. 1 through 6, are block diagrams illustrating that the first computer-enabled software tool 55 may be selected to perform actions either autonomously from, or collaboratively with, other first computer-enabled software tools 55x that predict adversarial cybersecurity-related activities 30 in the computer network 15 based on the pattern analysis 45. The other first computer-enabled software tools 55x may be similarly configured to the first computer-enabled software tool 55 and may be linked to the processor 40 or to other processing devices or systems, according to some examples. Moreover, FIGS. 7C and 7D, with reference to FIGS. 1 through 7B, are block diagrams illustrating that the second computer-enabled software tool 65 may be selected to perform actions either autonomously from, or collaboratively with, other second computer-enabled software tools 65x that identify mitigation and recovery actions 70 against the adversarial cybersecurity-related activities 30. The other second computer-enabled software tools 65x may be similarly configured to the second computer-enabled software tool 65 and may be linked to the processor 40 or to other processing devices or systems, according to some examples. According to an example, an autonomous first computer-enabled software tool 55 or second computer-enabled software tool 65 has no leader (i.e., no other tool controlling its actions) and may determine their own actions by processing the information from their respective environments. Moreover, these autonomous first and second computer-enabled software tools 55, 65 are programmed to learn for improving their respective partial or incorrect prior and present knowledge. Conversely, the first computer-enabled software tool 55 that is collaborative with other first computer-enabled software tools 55x is part of a multi-agent distributed system providing collaborative intelligence where each agent (i.e., software tool) is positioned with autonomy to contribute to a problem-solving network with each other. Similarly, the second computer-enabled software tool 65 that is collaborative with other second computer-enabled software tools 65x is part of a multi-agent distributed system providing collaborative intelligence where each agent (i.e., software tool) is positioned with autonomy to contribute to a problem-solving network with each other.

Figure 8A:
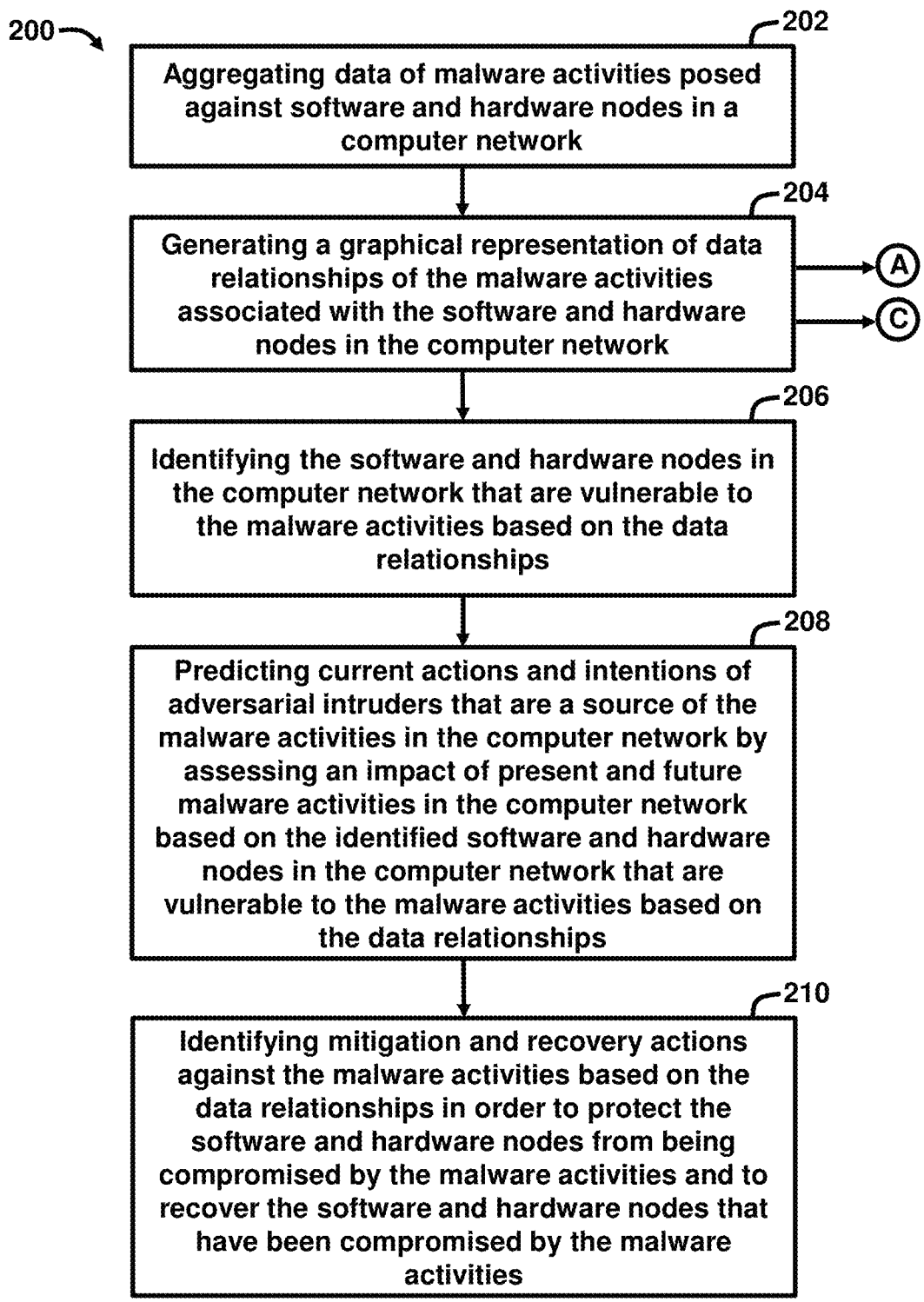
FIG. 8A is a flow diagram illustrating a method of providing cybersecurity resilience for a computer network, according to an embodiment herein.

FIG. 8A, with reference to FIGS. 1 through 7D, is a flow diagram illustrating a method 200 of providing cybersecurity resilience for a computer network 15, the method 200 comprising aggregating (202) data 25 of malware activities 31 posed against software and hardware nodes 35 in a computer network 15. The malware infection status of a given node may be inferred, based on all available information including cybersecurity measurements, log data, and the properties of against software and hardware nodes 35 and environment. The method 200 also comprises generating (204) a graphical representation 85 of data relationships 50 of the malware activities 31 associated with the software and hardware nodes 35 in the computer network 15, and identifying (206) the software and hardware nodes 35 in the computer network 15 that are vulnerable to the malware activities 31 based on the data relationships 50. According to some example, the data relationships 50 may comprise any of data analytics, data temporal causality analysis, and data regression analysis. Potential malware infection paths are constructed in the graphical representation 85 using local and global causality relationships and dependencies in context-specific environments involved with the assets of interest (i.e., the software and hardware nodes 35 of interest) using graph-based approaches. Malware infection labels of the software and hardware nodes 35, denoted by vertices, within the neighborhood of critical assets and links may be estimated using a Recurrent Neural Network (RNN), in particular, a LSTM network, for example.

The method 200 also includes predicting (208) current actions and intentions of adversarial intruders 80 that are a source of the malware activities 31 in the computer network 15 by assessing an impact 60 of present and future malware activities 31 in the computer network 15 based on the identified software and hardware nodes 35 in the computer network 15 that are vulnerable to the malware activities 31 based on the data relationships 50. This prediction may be performed by the first computer-enabled software tool 55, according to an example. The method 200 further includes identifying (210) mitigation and recovery actions 70 against the malware activities 31 based on the data relationships 50, which may be performed by the second computer-enabled software tool 65, in order to protect the software and hardware nodes 35 from being compromised by the malware activities 31 and to recover the software and hardware nodes 35 that have been compromised by the malware activities 31.

The method 200 may utilize a computer-enabled protocol model-guided motif (MGF), which may comprise an algorithm for forming paths, motifs, critical assets and links, infection propagation, the first computer-enabled software tool 55, and the second computer-enabled software tool 65. For those data 25 that seems to not have any specific relationships and value, the motifs can extract the quality information or patterns from big data, capture and formulate the important relationships among significant data features using the graphical representation 85, and then train a sequence learner, such as a LSTM network, with the help of the existing validated results. The LSTM network may be used to predict the values of the important asset features such as the infection status (i.e., whether the software and hardware nodes 35 have been or will likely be infected with malware activities 31). Moreover, the MGF process also benefits from the POMDP model in capturing the state of the assets' environment as well as providing the POMDP with a way of making better decisions on taking actions through LSTM predictions and the ongoing status of graph motifs. Because graph patterns of the assets' features are gradually learnt over time, the adversarial activitiesc 30 over the computer network 15 are inferred better by detecting and analyzing more relevant actions. This process results in more representative data of assets in the computer network 15 that can be taken as input data in the LSTM training, testing, and infection prediction process.

For the protocol MGF, the input includes the data 25. In an example, the data 25 may comprise cyber sensor 20 measurements for intrusion detection of the computer network 15, vulnerability scanning of the computer network 15, network traffic and monitoring of the computer network 15, and generated incident reports of analysts, if available, of the computer network 15. The POMDP or the second computer-enabled software tool 65 requests information on malware infection status of some assets so that the second computer-enabled software tool 65 can take appropriate mitigation and recovery actions 70 to the adverse impact 60 of the infection caused by the malware activities 31.

Figure 8B:
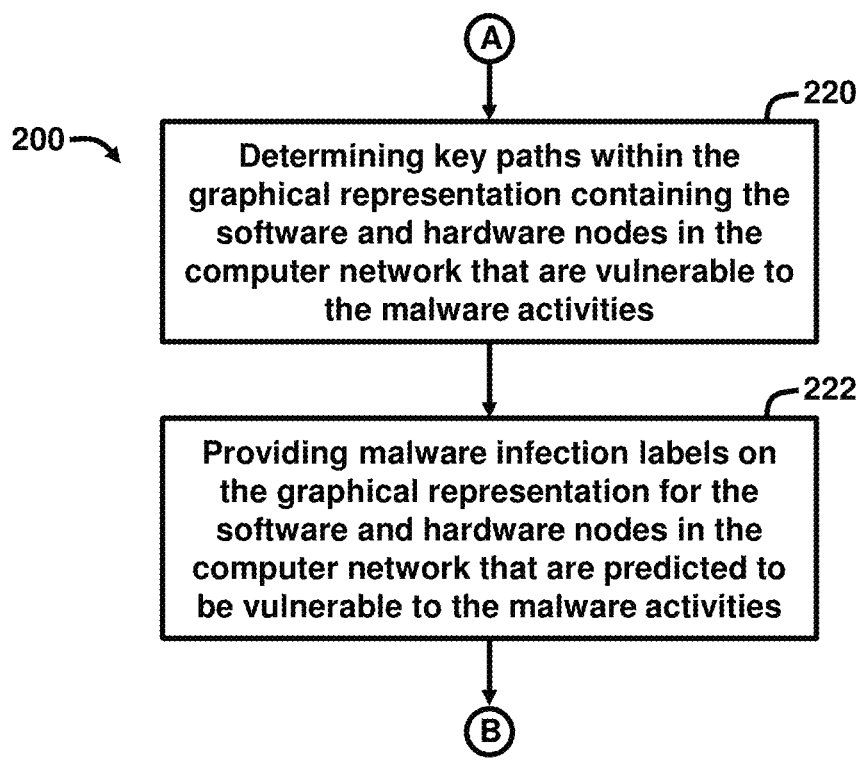
FIG. 8B is a flow diagram illustrating a method of configuring a graphical representation of a computer network, according to an embodiment herein.

The output is shown in FIG. 8B, with reference to FIGS. 1 through 8A, which is a flow diagram illustrating that the method 200 may comprise determining (220) key paths within the graphical representation 85 containing the software and hardware nodes 35 in the computer network 15 that are vulnerable to the malware activities 31; and providing (222) malware infection labels on the graphical representation 85 for the software and hardware nodes 35 in the computer network 15 that are predicted to be vulnerable to the malware activities 31, where each path corresponds to a different communication or service attribute of assets.

FIG. 8C, with reference to FIGS. 1 through 8B, is a flow diagram illustrating that the method 200 may comprise determining (224) connected components of the software and hardware nodes 35 represented in the graphical representation 85 at different time intervals; reshaping (226) each graphical component by filtering unnecessary nodes and links, and possibly adding new nodes and links; determining (228) motifs to be searched for a specific context of a cybersecurity environment related to the computer network 15 based on any of profiling and modeling of a context-specific environment of a target node in the computer network 15, wherein the target node comprises a central node in the graphical representation 85 such that the k-hop neighbors of the central node are determined using a breadth-first search process; searching (230) the motifs that represent the key paths and regions of each graphical representation 85 using the MGF search and filtering techniques; for nodes of motifs that already have the malware infection labels, using (232) a semi-supervised learning process and a neural network, such as a LSTM network, to predict the malware infection labels of other nodes at successive time intervals within a selected range of connectivity (i.e., in the neighborhood) of the context-specific environment with selected software and hardware nodes 35 (i.e., critical assets) and links; computing (234) malware infection weights of the links in the motifs of a specific context; and predicting (236) malware infection status labels of the nodes in the specific context.

The MGF is configured to filter out noise, thereby providing for better detection of relationships among cybersecurity measurements and observations, and assists the transformation of unstructured cybersecurity data to a structured data that can be fed as input data to a RNN such as the LSTM network. These actions can be in the form of queries, probes, or establishment of mechanisms to learn adversarial activities 30, or deceive adversarial intruders 80 by applying deceptive mechanisms and data.

Figure 8D:
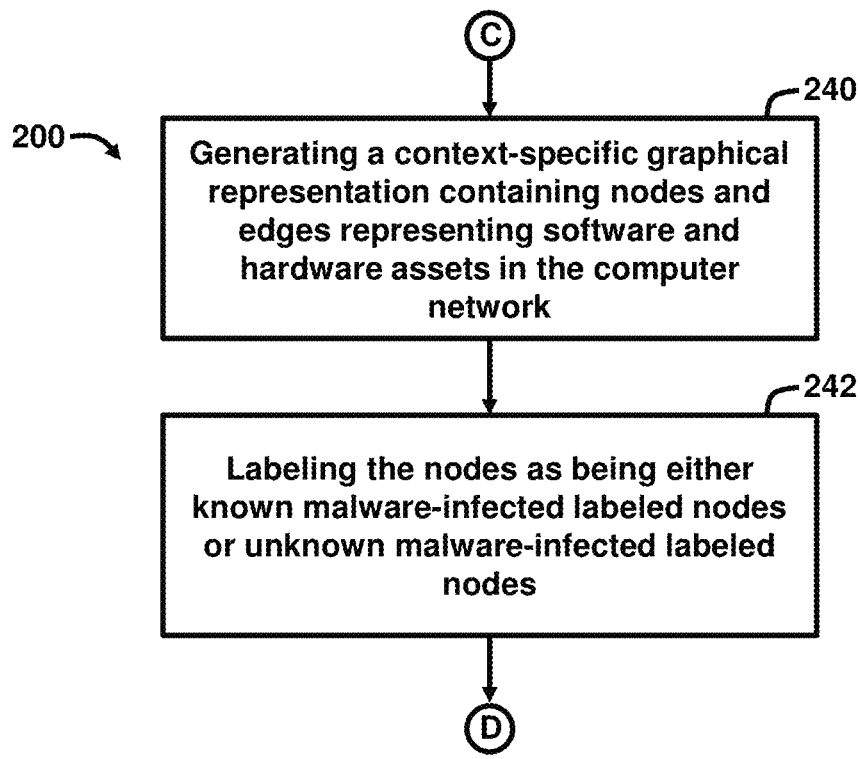
FIG. 8D is a flow diagram illustrating a method of providing an input for an infection status process, according to an embodiment herein.
Figure 8E:
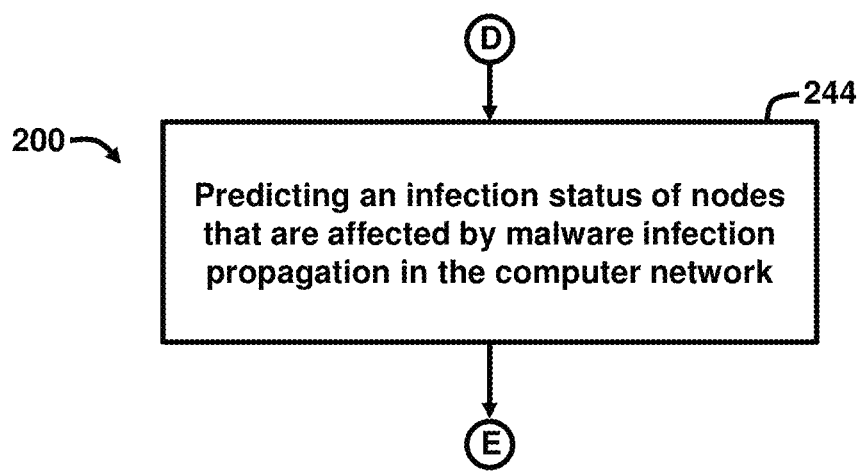
FIG. 8E is a flow diagram illustrating a method of predicting an infection status of nodes in a computer network, according to an embodiment herein.
Figure 8F:
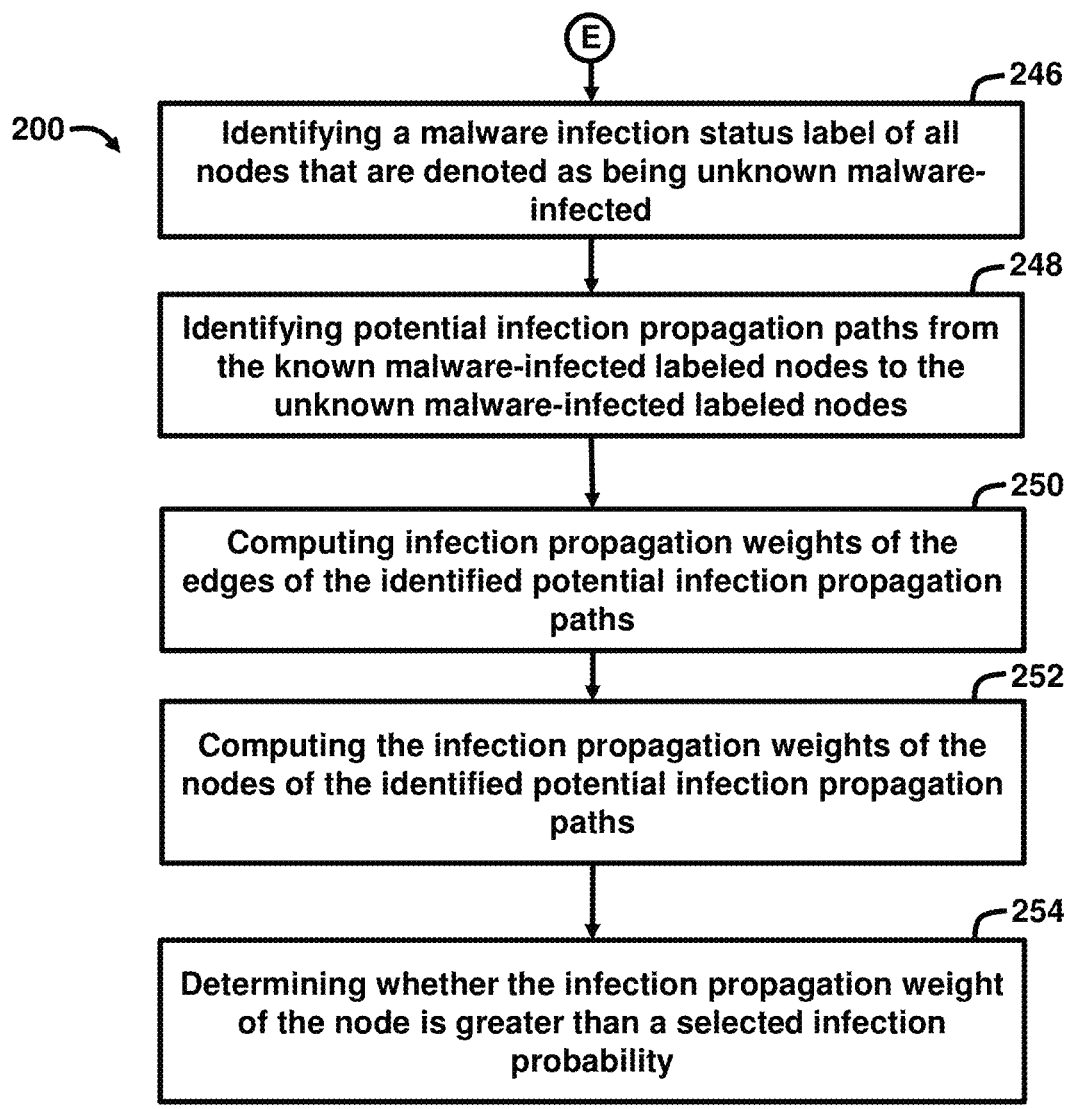
FIG. 8F is a flow diagram illustrating a method of providing an output for an infection status process, according to an embodiment herein.
Figure 9:
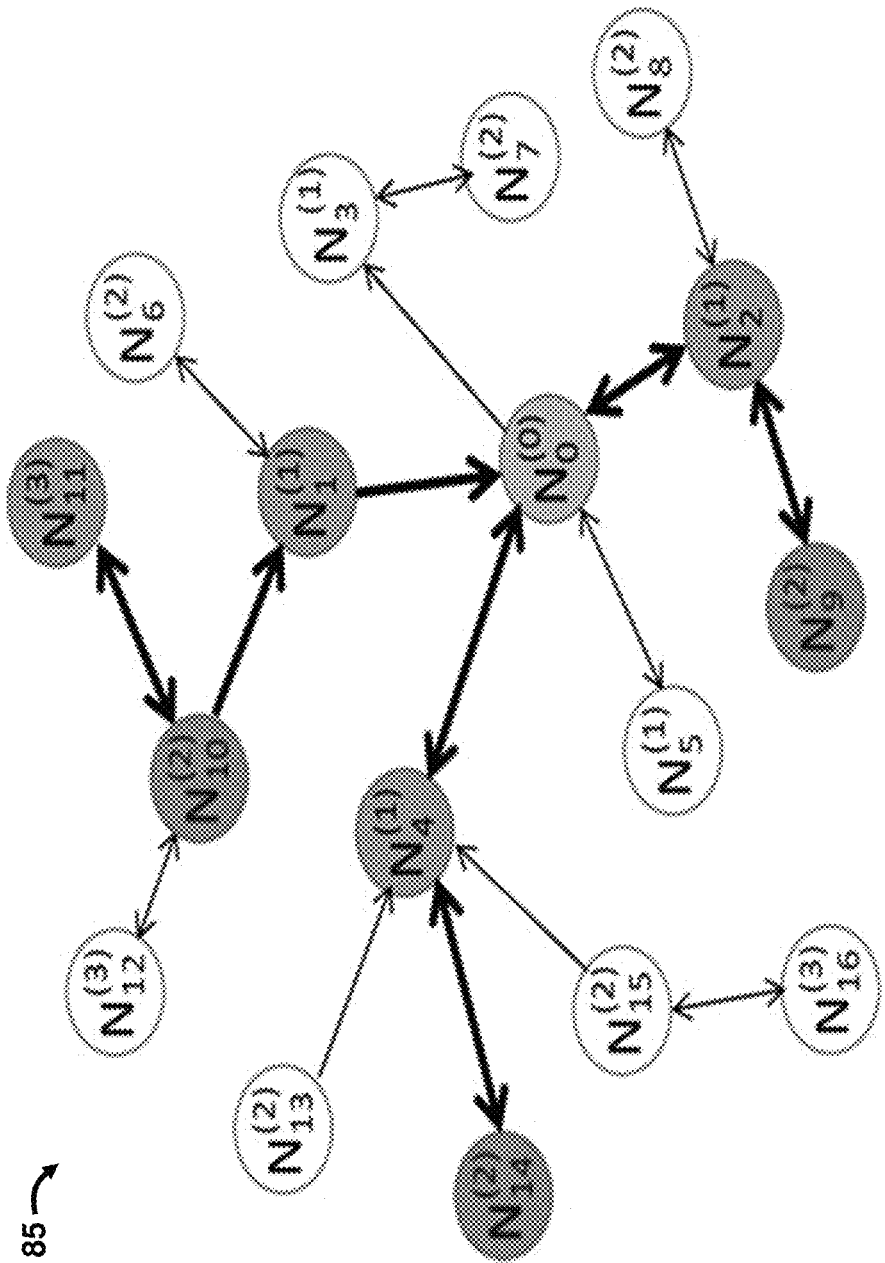
FIG. 9 is a representation illustrating a graph of nodes representing the most significant assets in a network that should be taken into consideration based on cybersecurity measurements, according to an embodiment herein.

FIG. 9, with reference to FIGS. 1 through 8C, illustrates a graphical representation 85 of nodes representing the most significant assets that should be taken into consideration under current circumstances of attacks, based on collected cybersecurity measurements taken by the sensor 20. This graphical representation 85 of assets may be obtained through data analytics, temporal causality analysis, and regression analysis. In FIG. 9, the central node $N_o^{(0)}$ represents a given asset whose malware infection status is requested to be estimated, where the subscript zero shows its ID and the superscript zero denotes the number of hops that it is away from the central node. The superscripts 1, 2, and 3 of a node label indicate whether the node is 1-hop, 2-hop, or 3-hop nodes away, respectively, from the node $N_o^{(0)}$. The thick solid lines/arrows denote the key paths. The k-hop neighboring nodes $N_o^{(0)}$ are first determined using breadth-first search. Then, the possible motifs corresponding to the patterns and characteristics of potential malware infection and propagation between $N_o^{(0)}$ and its k-hop neighboring nodes are predicted by the processor 40.

Most of the time, the infection status of all assets is unknown, and the cybersecurity measurements data are usually unlabeled. However, it may be possible to detect anomalies and predict the infection status of some assets, based on the cybersecurity alerts 100 of the sensor 20, intelligence reports, and the results of unsupervised learning on the characteristics of assets. When malware infection observations of one or more nodes within a context-specific environment are requested by POMDP or the second computer-enabled software tool 65, at least some distant neighboring nodes of these requested nodes are likely to have malware infection labels or some information about susceptible levels of infection through which their infection labels may be predicted using dependencies and temporal causality information of cybersecurity measurements. When the infection labels of some nodes are available as shown in FIG. 10, with reference to FIGS. 1 through 9, a combination of semi-supervised learning, graph thinking, and the LSTM network may be applied to infer the infection labels of nodes as shown with the method 200 described in FIGS. 8D through 8F.

Figure 10:
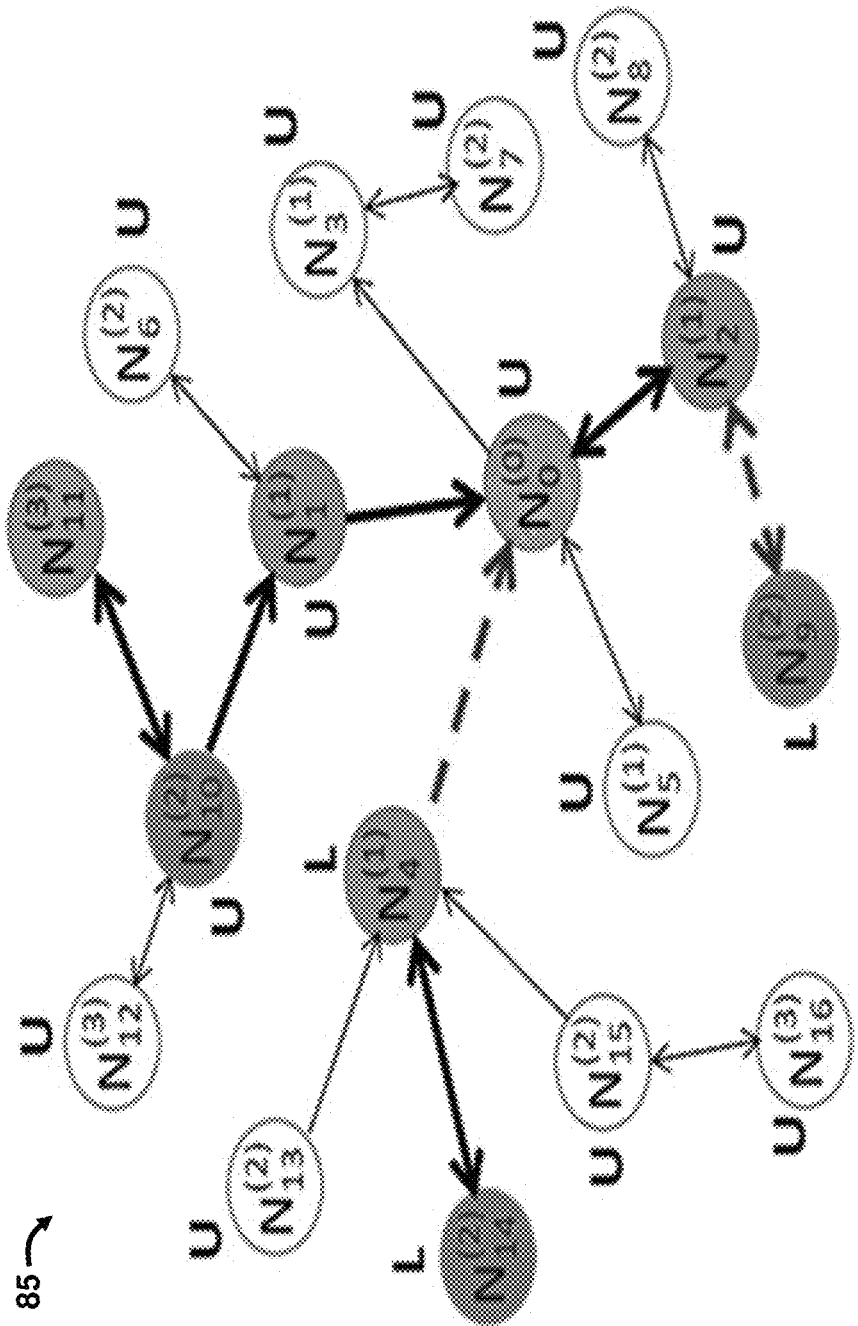
FIG. 10 is a representation illustrating the graph of nodes of FIG. 9 with some of the nodes labeled with infection labels, according to an embodiment herein.

FIG. 8D, with reference to FIGS. 1 through 8C and FIGS. 9 and 10, is a flow diagram illustrating that the method 200 may comprise generating (240) a context-specific graphical representation 85 containing nodes and edges representing software and hardware assets in the computer network 15; and labeling (242) the nodes as being either known malware-infected labeled nodes or unknown malware-infected labeled nodes. With reference to FIG. 10, some of the nodes are labeled, denoted L, to indicate that their infection status is known, whereas the rest of the nodes are unlabeled, denoted U, to indicate that their infection status is not known. Semi-supervised learning is used to predict the infection labels of U-type nodes. A dashed edge represents a broken infection communication between its vertices, where infection could be propagated via applications, services, emails, database access, etc. Semi-supervised learning is applied to predict infection labels of U-type nodes.

FIG. 8E, with reference to FIGS. 1 through 8D and FIGS. 9 and 10, is a flow diagram illustrating that the method 200 may comprise predicting (244) an infection status of nodes that are affected by malware infection propagation in the computer network 15. FIG. 8F, with reference to FIGS. 1 through 8E and FIGS. 9 and 10, is a flow diagram illustrating that the method 200 may comprise identifying (246) a malware infection status label of all nodes that are denoted as being unknown malware-infected. In this regard, the infection status labels are initialized for all nodes denoted by U to zero in the graphical representation 85 shown in FIG. 10. Next, the method 200 comprises identifying (248) potential infection propagation paths from the known malware-infected labeled nodes to the unknown malware-infected labeled nodes. Here, the method 200 finds all the potential infection propagation paths of various lengths from the L-labeled nodes to one or more U-labeled nodes such as $N_0$ and $N_4$ shown in FIG. 10.

Thereafter, the method 200 comprises computing (250) infection propagation weights of the edges of the above-identified potential infection propagation paths. An infection propagation weight of each edge equals a probability that a communication with malware infection can be established between two nodes of the edge; computing (252) the infection propagation weights of the nodes of the identified potential infection propagation paths, wherein the infection propagation weight of each edge of the node equals a maximum average of incoming and outgoing infection propagation weights of the node. Next, the method 200 comprises determining (254) whether the infection propagation weight of the node is greater than a selected infection probability. In this regard, for example, if a node's infection propagation weight is greater than a predefined infection probability, $T_{infprop}$, then an infection label of 1 is assigned to it in order to indicate that it is infected, otherwise an infection label of 0 is assigned to it to indicate that it is not yet infected.

Figure 11:
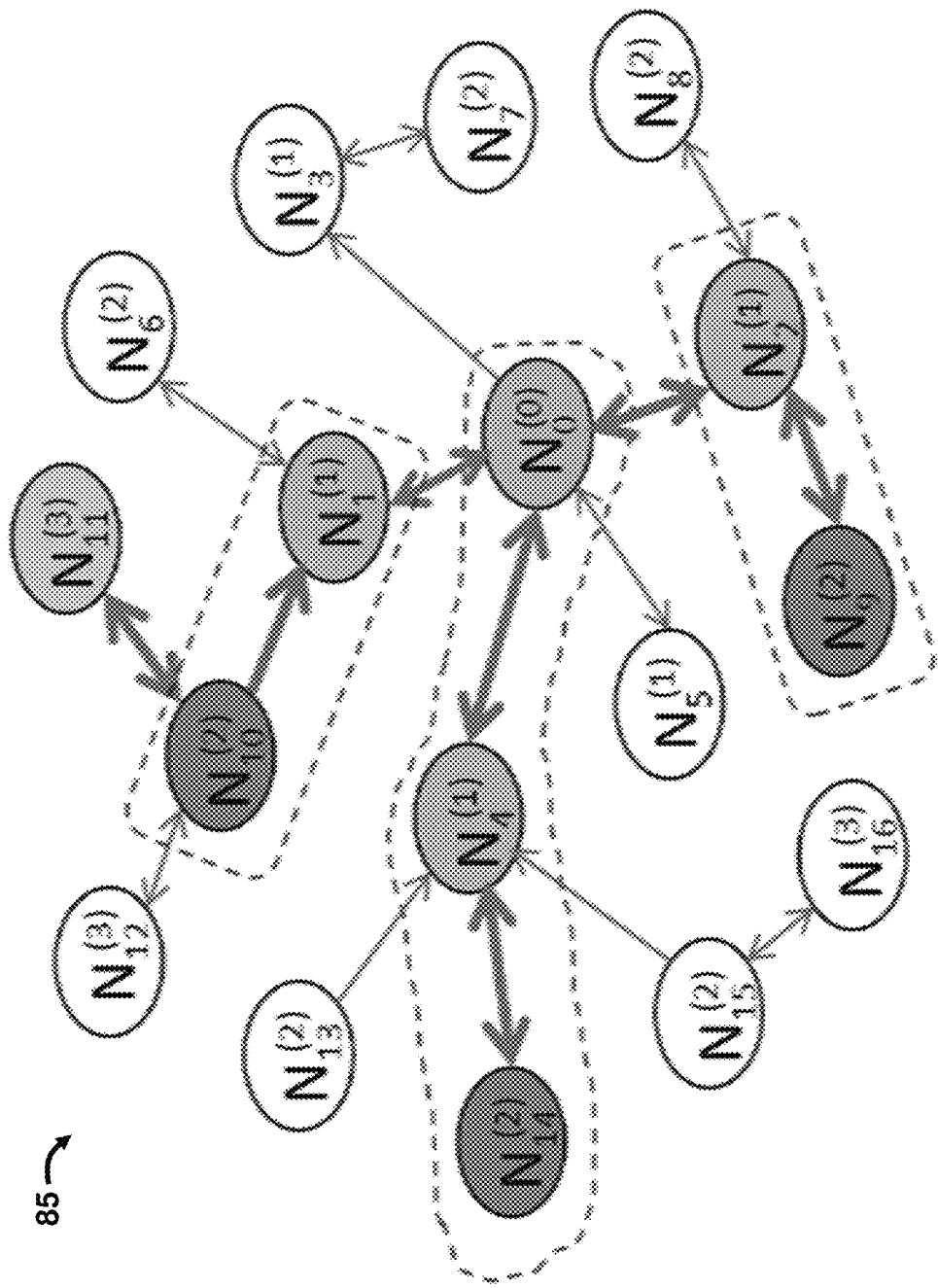
FIG. 11 is a representation illustrating the graph of nodes of FIG. 9 with critical links identified, according to an embodiment herein.

Each state of the POMDP may represent the malware infection status of an entity (e.g., an asset or a group of assets). Perhaps, an entity could initially represent a group of assets and then could correspond to more assets while receiving more accurate, detailed, and frequent measurements and observations. In building the graphical representation 85 of a context-specific environment, it is ensured that each path of the graphical representation 85 is involved with a node corresponding to an asset of interest. To protect the critical assets and links (or edges) of the graph, some nodes and links of the graphical representation 85 are designated as critical. As an example, FIG. 11, with reference to FIGS. 1 through 10, illustrates critical links and assets of $(N_1, N_{10})$, $(N_0, N_4, N_{14})$, $(N_9, N_2)$. In FIG. 11, the dash rectangles designate the critical links of graph: $(N_1, N_{10})$, $(N_0, N_4, N_{14})$, $(N_9, N_2)$. Each dash rectangle of the graph is also referred to herein as a critical subgraph.

Figure 12B:
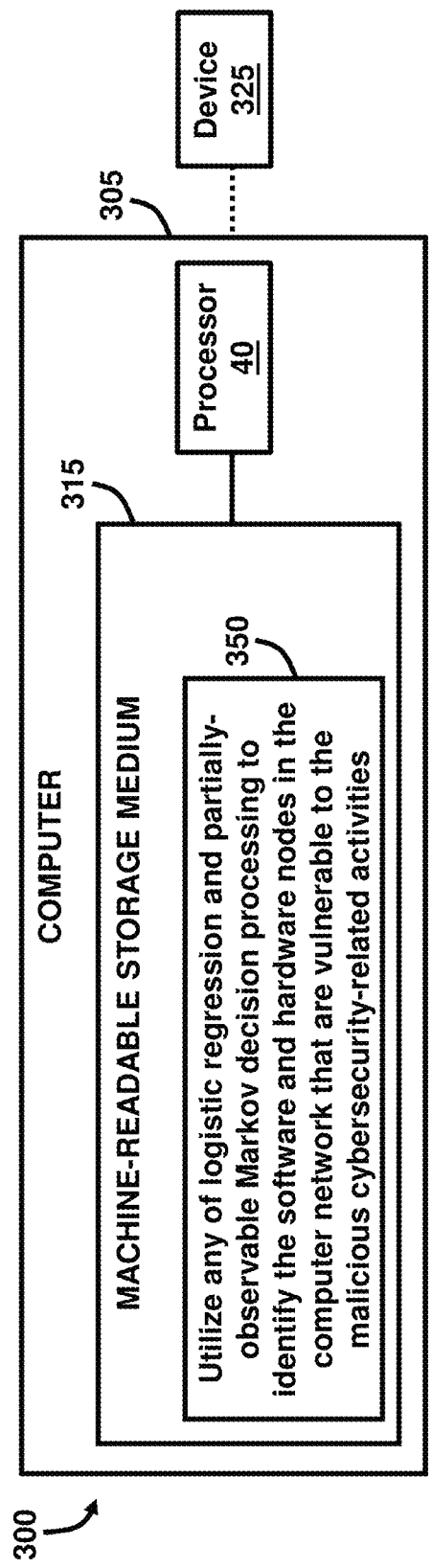
FIG. 12B is a block diagram illustrating a system for identifying vulnerabilities in a computer network, according to an embodiment herein.

FIG. 12A, with reference to FIGS. 1 through 11, is a block diagram illustrating an example system 300 to perform cybersecurity. In the example of FIGS. 12A through 12D, a computer 305 includes a processor 40 and a machine-readable storage medium 315. In some examples, the system 300 may be a stand-alone system or part of another system (s). The processor 40 may include a central processing unit, microprocessors, hardware engines, and/or other hardware devices suitable for retrieval and execution of instructions stored in a machine-readable storage medium 315. The processor 40 may fetch, decode, and execute computer-executable instructions 310 to enable execution of locally-hosted or remotely-hosted applications for controlling action of the system 10, 300. The remotely-hosted applications may be accessible on remotely-located devices; for example, remote communication device 325. For example, the remote communication device 325 may be a computer, tablet device, smartphone, or remote server. As an alternative or in addition to retrieving and executing instructions, processor 40 may include electronic circuits including a number of electronic components for performing the functionality of the computer-executable instructions 310.

The machine-readable storage medium 315 may be any electronic, magnetic, optical, or other physical storage device that stores executable instructions. Thus, the machine-readable storage medium 315 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 315 may include a non-transitory computer-readable storage medium 315. The machine-readable storage medium 315 may be encoded with executable instructions for enabling execution of remotely-hosted applications accessed on the remote communication device 325.

In an example, the processor 40 of the computer 305 executes the computer-executable instructions 310. The computer-executable instructions 310 comprise instructions 330-365. The instructions 330 aggregate data 25 of benign and malicious cybersecurity-related activities 34 posed against software and hardware nodes 35 in a computer network 15. The instructions 335 identify the software and hardware nodes 35 in the computer network 15 that are vulnerable to malicious cybersecurity-related activities 32. The instructions 340 instruct a first computer-enabled software tool 55 to predict current actions and intentions of adversarial intruders 80 that are a source of the malicious cybersecurity-related activities 32 by assessing an impact 60 of present and future benign and malicious cybersecurity-related activities 34 in the computer network 15 based on a pattern analysis 45 of the benign and malicious cybersecurity-related activities 34. The first computer-enabled software tool 55 may mimic the actions of adversarial intruders 80 by taking processed measurements and observations as input data in order to predict the impact 60 of the present and future benign and malicious cybersecurity-related activities 34 in the computer network 15. The instructions 345 instruct a second computer-enabled software tool 65 to identify mitigation and recovery actions 70 against the malicious cybersecurity-related activities 32 that will compromise the software and hardware nodes 35 in the computer network 15 based on the pattern analysis 45 by maintaining a healthy/non-infected status of the software and hardware nodes 35, block the malicious cybersecurity-related activities 32 from attacking the software and hardware nodes 35, or prevent the software and hardware nodes 35 from being exploited by the malicious cybersecurity-related activities 32.

The first computer-enabled software tool 55 (i.e., the adversary agent) may function similar to an adversarial intruder 80, and accordingly the first computer-enabled software tool 55 is configured or programmed to predict the present and future benign and malicious cybersecurity-related activities 34 (i.e., adversary actions) that may compromise the software and hardware nodes 35 (i.e., assets in the computer network 15), whereas the second computer-enabled software tool 65 (i.e., the defender agent) is configured or programmed to identify actions 70 to protect and recover the software and hardware nodes 35 (i.e., assets in the computer network 15) that will be or have been compromised by the adversarial intruder 80. The first computer-enabled software tool 55 (i.e., the adversary agent) estimates the weakness of the computer network 15 and attempts to take actions to exploit the software and hardware nodes 35 (i.e., assets) and further utilizes machine learning and graph thinking techniques to predict or uncover the missing or unclear malicious cybersecurity-related activities 32 (i.e., adversary activities), so that the accuracy and assessment of the malicious cybersecurity-related activities 32 (i.e., adversary activities) within the computer network 15 (i.e., a cybersecurity environment) are enhanced significantly. Consequently, the second computer-enabled software tool 65 (i.e., the defender agent) estimates the security environment associated with the computer network 15 and can take more accurate and effective defensive actions 70 with the help of deep reinforcement learning and graph thinking. Both the first computer-enabled software tool 55 and the second computer-enabled software tool 65 perceive the environment of the computer network 15 through the sensor 20, for example, and correspondingly and respectively acts as described above through actuators (not shown) or other mechanisms or tools used to interact with the software and hardware nodes 35 and/or the computer network 15.

Additionally, the automated first computer-enabled software tool 55 and the second computer-enabled software tool 65 may play a zero-sum observability-based game to provide better observability and controllability over a cybersecurity environment such as the context-specific neighborhood of the above critical assets and links. Because the first computer-enabled software tool 55 selects and executes actions based on cybersecurity measurements and observations, the game of the first computer-enabled software tool 55 and the second computer-enabled software tool 65 is called a zero-sum observations-aware stochastic game. As for the observability of the computer network 15, the first computer-enabled software tool 55 aims at inferring and mimicking adversary activities, based on cybersecurity measurements, using reinforcement and deep learning. As for the controllability of the computer network 15, the second computer-enabled software tool 65 aims to determine cost-effective recovery and protection actions against the adverse impact of infection and exploitation.

In an example, the first computer-enabled software tool 55 and the second computer-enabled software tool 65 employ Temporal Difference (TD) learning to select the actions to be executed. The first computer-enabled software tool 55 may mimic or emulate the adversarial activities 30 of a cybersecurity environment in accordance with the cybersecurity measurements and observations so that the present and future activities of adversarial intruders 80 can be identified and predicted more accurately. The infection states of entities in a cybersecurity environment may be partially observable by both the first computer-enabled software tool 55 and the second computer-enabled software tool 65. Because the first computer-enabled software tool 55 and the second computer-enabled software tool 65 select and execute actions based on cybersecurity measurements and observations, and the game of the first computer-enabled software tool 55 and the second computer-enabled software tool 65 is called a zero-sum observations-aware stochastic game. If the assets of a critical subgraph are infected or exploited by the first computer-enabled software tool 55, then the first computer-enabled software tool 55 is said to gain a win. Similarly, if the assets of a critical subgraph are recovered or prevented from infection or exploitation by the second computer-enabled software tool 65, then the second computer-enabled software tool 65 is said to gain a win.

Figure 12C:
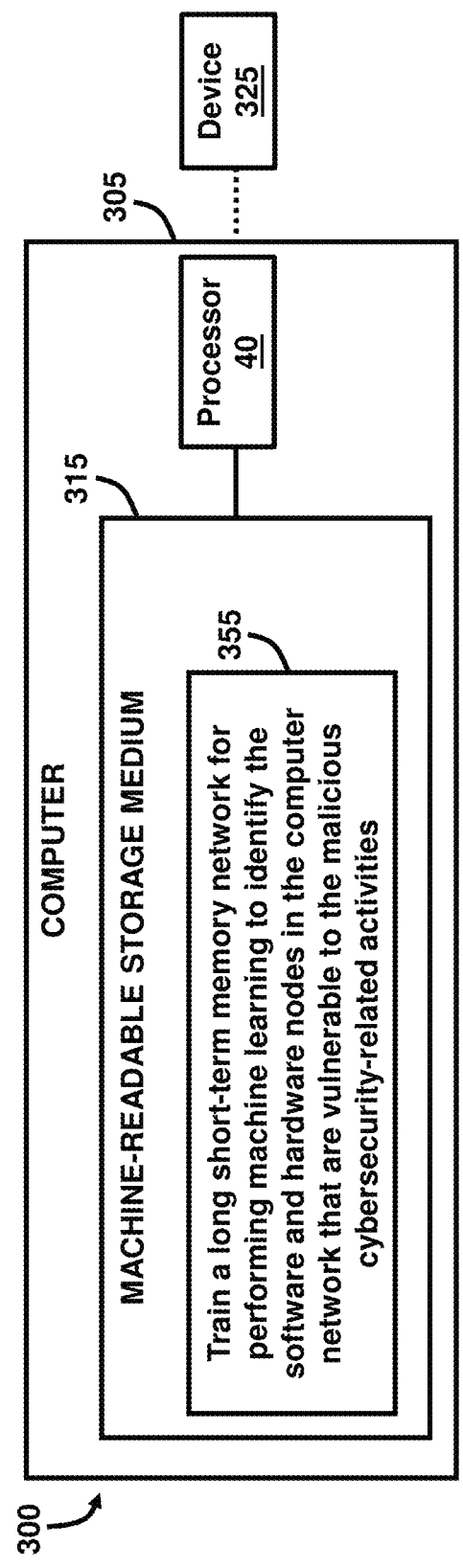
FIG. 12C is a block diagram illustrating a system for performing machine learning, according to an embodiment herein.

FIG. 12B, with reference to FIGS. 1 through 12A, is a block diagram illustrating that the computer-executable instructions 310, when executed, may further cause the processor 40 to perform utilizing instructions 350 to utilize any of logistic regression and the partially-observable Markov decision processing (POMDP) to identify the software and hardware nodes 35 in the computer network 15 that are vulnerable to the malicious cybersecurity-related activities 32. FIG. 12C, with reference to FIGS. 1 through 12B, is a block diagram illustrating that the computer-executable instructions 310, when executed, may further cause the processor 40 to perform training instructions 355 to train a long short-term memory (LSTM) network for performing machine learning to identify the software and hardware nodes 35 in the computer network 15 that are vulnerable to the malicious cybersecurity-related activities 32. Cybersecurity data 25 has temporal dependencies; i.e., it is noisy, deceptive, incomplete, and heterogeneous. A neural network 95 such as a LSTM network computes the hidden state as a function of the input sequence of the data 25, and the LSTM network learns sequences in the input data 25. Moreover, for a given set of critical software and hardware nodes 35 in the computer network 15, the LSTM network is used to learn and create the highly relevant neighboring nodes from various perspectives including logical neighborhoods, services, tasks, mission, operating system, mobility, etc. and then creates graphs for each.

FIG. 12D, with reference to FIGS. 1 through 12C, is a block diagram illustrating that the computer-executable instructions 310, when executed, may further cause the processor 40 to perform creating instructions 360 to create most-likely data patterns and relationships of the software and hardware nodes 35 in the computer network 15 that are vulnerable to the malicious cybersecurity-related activities 32; and perform creating instructions 365 to create queries to search the data patterns and relationships to identify a cybersecurity environment associated with the software and hardware nodes 35 in the computer network 15 that are vulnerable to the malicious cybersecurity-related activities 32. Accordingly, the embodiments herein construct multiple most-likely patterns of these assets (i.e., the software and hardware nodes 35) and relationships, and create queries to search these patterns in the graphical representation 85 corresponding to the cyber security environment of specific assets. These queries make use of various attributes of assets (i.e., vertices) and their relationships (i.e., edges), including timestamp, infection influence, compromised personal computer (PC), etc.

EXPERIMENTS

A comprehensive dataset summarizing 58 days of (anonymized) traffic on the enterprise network of Los Alamos National Laboratory (LANL) was utilized for performing experiments testing the system 10, 300 and method 200 provided by the embodiments herein. Particular focus was placed on the so-called "redteam" part of this LANL dataset, as described being the occurrence of a redteam penetration testing operation by four attacker PCs during the data collection period. Data samples of the authentication, flow, and redteam are illustrated in FIGS. 13 through 15.

To show the infection status labels of the dest_PC of redteam data, a new column called comp_dst_PC is added as shown in FIG. 16. Accordingly, the new column, called comp_dst_PC, is added to the LANL data, after the infection status of PCs are estimated, based on whether they are accessed by any designated attacker PC. In order to assess the performance of the techniques provided by the embodiments herein, first a group of PCs are selected that are of interest. Then, a graph is constructed of these selected assets by establishing all their potential connections due to communication, service, etc.

Figure 17:
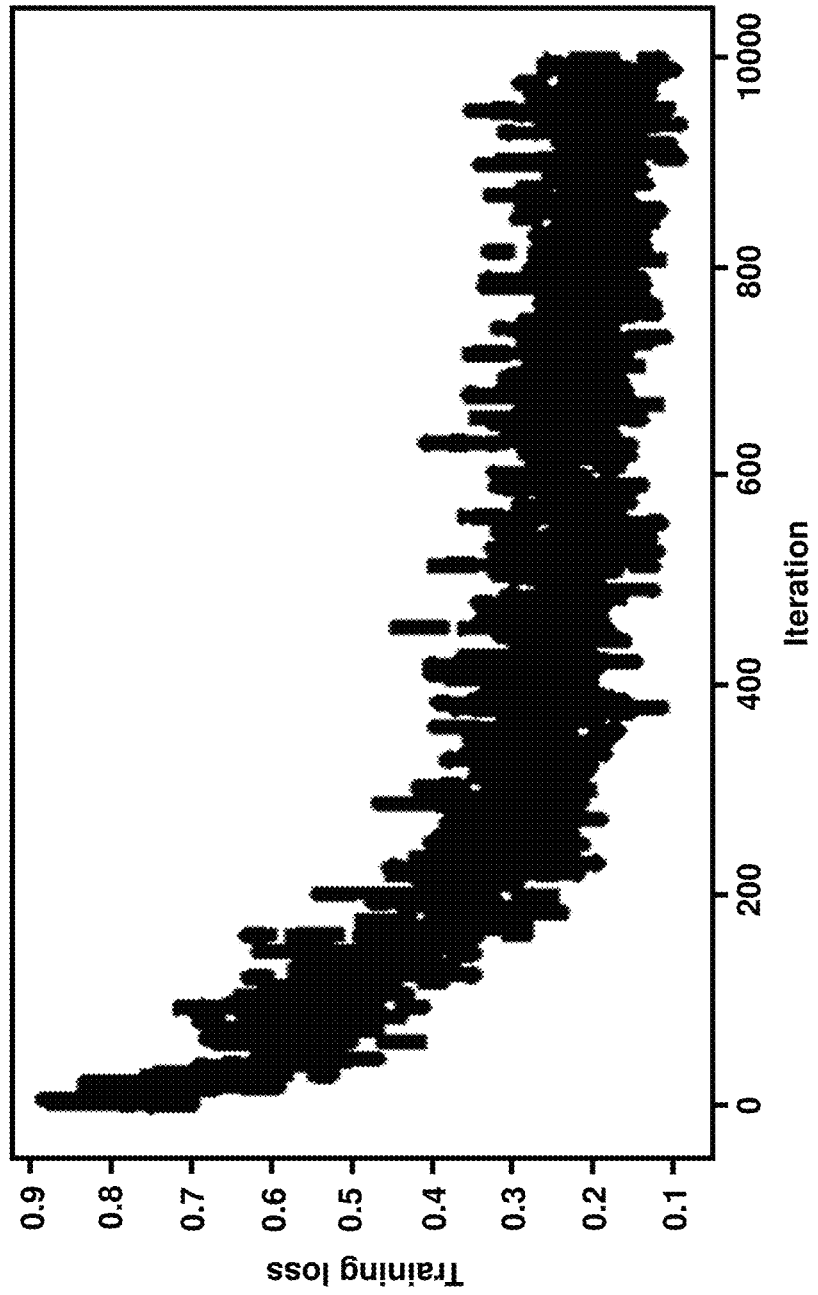
FIG. 17 is a graphical representation illustrating experimental results for LSTM training loss per iteration, according to an embodiment herein.

After building the graph, a LSTM is used to estimate the infection labels of the assets. A supervised or semi-supervised learning algorithm is applied to estimate the infection status labels. As shown in FIG. 10, the embodiments herein assume that some assets may not be labeled properly due to the lack of sufficient information of cybersecurity measurements. To overcome such deficiencies and improve the accuracy of infection status estimation of assets, the potential propagation of infections among assets over their subgraph are considered. This process utilizes gradual improvement of the training loss of the LSTM prediction, as illustrated in FIG. 17. The LSTM-based infection prediction results are evaluated using a confusion matrix and the metrics of precision, recall, and f1-score. FIG. 18 illustrates the evaluation of LSTM-based infection prediction results using the confusion matrix.

Figure 19:
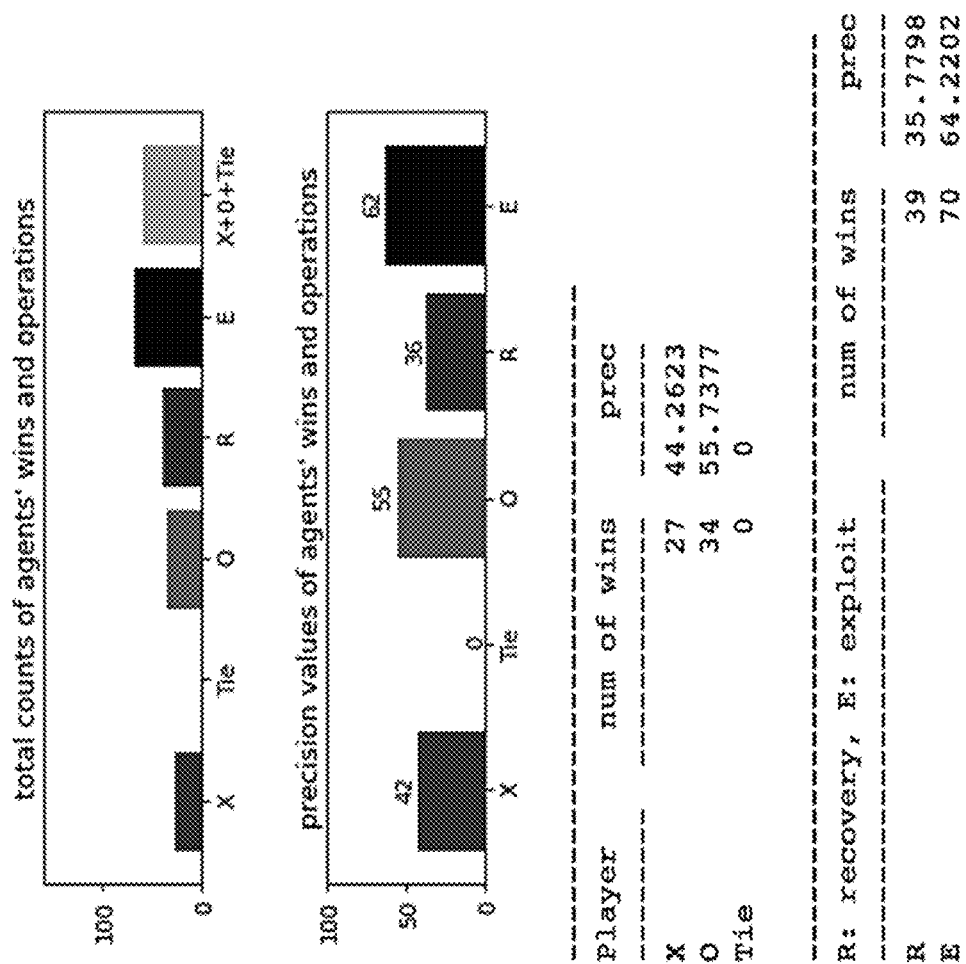
FIG. 19 are graphical representations and data of the experimental results, according to an embodiment herein.

FIG. 19 illustrates the results of "wins" by adversary and defender agents (i.e., the first computer-enabled software tool 55 and the second computer-enabled software tool 65), where the table in FIG. 19 shows the list of game wins by adversary and defender agents at a point of time. The player letters X and O refer to the adversary and defender agents, respectively. A win of adversary agent occurs when the assets of a critical subgraph are infected or exploited, whereas a win of defender agent occurs when the assets of a critical subgraph partition are recovered or protected from infection and exploitation. The adversary agent X aims to exploit (i.e., E) assets, whereas the defender agent O aims to protect and recover (i.e., R) assets. In the game that was experimentally played, the defender agent achieves 39 recovery operation, while the adversary agent accomplishes 70 infection and exploitations over the graph's assets. The behavior of adversary agent is mostly determined in accordance with the cybersecurity measurements of the assets of interest, whereas the defender agent makes decisions based on its perception of the cybersecurity environment just after the adversary agent takes an action. These agents use various types of neural networks and reinforcement learning in determining their actions. As a reinforcement learning algorithm, the agents may utilize TD learning.

The embodiments herein provide an automated approach for providing cybersecurity resilience for data sets comprising big data having noisy, incomplete, deceptive, and heterogeneous data within a dynamic environment involved with uncertainties, critical assets, and processing deadlines. The embodiments herein utilize reinforcement and deep learning in the processes of infection prediction and action decision making, which can tolerate errors and make the defense more robust against changes on adversarial tactics and attacks. The adversary agent (i.e., the first computer-enabled software tool 55) can not only identify current adversary activities but also predict the future adversary activities by incrementally increasing its knowledge on the intentions of adversarial intruders 80. Moreover, the embodiments herein provide the ability to incorporate tactical network features into the attributes of assets and the mechanism of an automated system 10, 300 and method 200. Accordingly, the embodiments herein provide active malware defense models, methods, and software agents for detecting, predicting and controlling malware infection and spread with automated responses using machine learning, causality and predictive analytics, and online data. Furthermore, the embodiments herein provide trust-based collaborative agents, models of dynamic risk and maneuvers, and adaptive methods to detect, predict, and control cyber dangers including malware infection and spread over tactical networks.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A system for providing cybersecurity resilience for a computer network, the system comprising:
 a sensor that collects data of adversarial cybersecurity-related activities posed against software and hardware nodes in the computer network,
 a processor that:
  aggregates the data; and
  performs pattern analysis of the aggregated data by (i) analyzing data relationships of the adversarial cybersecurity-related activities, and (ii) identifying the software and hardware nodes in the computer network that are vulnerable to the adversarial cybersecurity-related activities,
 a first computer-enabled software tool that predicts current actions and intentions of adversarial intruders that are a source of the adversarial cybersecurity-related activities in the computer network by assessing an impact of present and future adversarial cybersecurity-related activities that will compromise the software and hardware nodes in the computer network based on the pattern analysis wherein said pattern analysis utilizes Markov chain analysis or Dirichlet distribution functions;
 a second computer-enabled software tool that identifies mitigation and recovery actions against the adversarial cybersecurity-related activities based on the pattern analysis in order to protect the software and hardware nodes from being compromised by the present and future adversarial cybersecurity-related activities and to recover the software and hardware nodes that have been compromised wherein the pattern analysis comprises any of artificial intelligence, machine learning, and graph thinking and wherein the first computer-enabled software tool mimics operational activities of the adversarial intruders that are the source of the adversarial cybersecurity-related activities in the computer network and wherein the mitigation and recovery actions identified by the second computer-enabled software tool comprises any of preventive action and recovery action against an occurrence and spread of the adversarial cybersecurity-related activities to the software and hardware nodes in the computer network and wherein the processor creates a graphical representation of a data path containing the adversarial cybersecurity-related activities in the computer network using the data relationships of the adversarial cybersecurity-related activities; and
 a multi-agent coordination mechanism for autonomous adversary agents of first software tool and autonomous defender agents of second software tool to coordinate their collaborative and individual actions in a distributed network system environment such that autonomous adversary and defender agents independently and collaboratively work in their decision-making process; the decisions and actions of autonomous adversary agents are taken as input by the autonomous defender agents of the second software tool while making decisions and taking actions on asset protection and recovery; including autonomous adversary agents mimic the behavior and decision-making process of adversary to predict its present and near-future activities or capabilities by inferring their limitations and objectives while attacking defender's assets and network environment so that defender agents can better predict how and what adversary can decide and aim to attack and compromise assets and, autonomous defender and adversary agents are dynamically trained to not only learn or predict what adversary activities occur on defender assets and network environment, but also infer how and why these adversary activities take place in adversary decision-making process; and a very important aspect of the first software tool is that the present and near-future activities of adversary are predicted by machine learning and graph thinking; and further comprising autonomous adversary and defender agents may implement a zero-sum game with the help of multi-agent coordination mechanism.

2. The system of claim 1, wherein the data relationships comprise local and global causality relationships and dependencies in context-specific environments involved with the adversarial cybersecurity-related activities associated with the software and hardware nodes in the computer network that are of interest, wherein the software and hardware nodes in the computer network that are of interest are identified as vertices of the graphical representation of the data path, and wherein the local and global causality relationships and dependencies comprise edges of the graphical representation of the data path.

3. The system of claim 1, wherein the processor utilizes a recurrent neural network that estimates which of the software and hardware nodes within a selected range of connectivity have been subjected to the adversarial cybersecurity-related activities based on any of:
  detected adversarial cybersecurity-related activities on any of the software and hardware nodes within the selected range of connectivity, and
  predicted adversarial cybersecurity-related activities based on any of: cybersecurity alerts generated by the sensor;
    vulnerability scanning reports stored in memory and retrieved by the processor;
    data analytic reports stored in memory and retrieved by the processor; and
    machine learning of operational attributes of the software and hardware nodes in the computer network.

4. The system of claim 1, wherein the first computer-enabled software tool is selected to perform actions either autonomously from, or collaboratively with, other first computer-enabled software tools that predict adversarial cybersecurity-related activities in the computer network based on the pattern analysis, and wherein the second computer-enabled software tool is selected to perform actions either autonomously from, or collaboratively with, other second computer-enabled software tools that identify mitigation and recovery actions against the adversarial cybersecurity-related activities.

5. A method of providing cybersecurity resilience for a computer network, the method comprising:
  aggregating data of malware activities posed against software and hardware nodes in a computer network,
  generating a graphical representation of data relationships of the malware activities associated with the software and hardware nodes in the computer network,
  identifying the software and hardware nodes in the computer network that are vulnerable to the malware activities based on the data relationships,
  predicting current actions and intentions of adversarial intruders that are a source of the malware activities in the computer network by assessing an impact of present and future malware activities in the computer network based on the identified software and hardware nodes in the computer network that are vulnerable to the malware activities based on the data relationships,
  identifying mitigation and recovery actions against the malware activities based on the data relationships in order to protect the software and hardware nodes from being compromised by the malware activities and to recover the software and hardware nodes that have been compromised by the malware activities wherein the data relationships comprise any of data analytics, data temporal causality analysis, and data regression analysis and wherein the data comprises cyber sensor measurements for intrusion detection of the computer network, vulnerability scanning of the computer network, network traffic and monitoring of the computer network, and generated incident reports of the computer network; and developing
  a multi-agent coordination mechanism for autonomous adversary agents of first software tool and autonomous defender agents of second software tool to coordinate their collaborative and individual actions in a distributed network system environment such that the decisions and actions of autonomous adversary agents are taken as input by the autonomous defender agents of the second software tool while making decisions and taking actions on asset protection and recovery; autonomous adversary agents mimic the behavior and decision-making process of adversary to predict its present and near-future activities or capabilities by inferring their limitations and objectives while attacking defender's assets and network environment so that defender agents can better predict how and what adversary can decide and aim to attack and compromise assets; autonomous defender and adversary agents are dynamically trained and assisted to not only learn or predict what adversary activities occur on defender assets and network environment, but also infer how and why these adversary activities take place in adversary decision-making process; and autonomous adversary and defender agents may implement a zero-sum game with the help of multi-agent coordination mechanism.

* * * * *